United States Patent
Yamada et al.

(10) Patent No.: US 8,655,087 B2
(45) Date of Patent: Feb. 18, 2014

(54) IMAGE DECODING DEVICE AND IMAGE DECODING METHOD FOR DECODING COMPRESSED DATA

(75) Inventors: Yoshihisa Yamada, Tokyo (JP); Shunichi Sekiguchi, Tokyo (JP); Yoshimi Moriya, Tokyo (JP); Kazuo Sugimoto, Tokyo (JP); Yuichi Idehara, Tokyo (JP); Kohtaro Asai, Tokyo (JP); Tokumichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 830 days.

(21) Appl. No.: 11/926,818

(22) Filed: Oct. 29, 2007

(65) Prior Publication Data

US 2009/0028427 A1    Jan. 29, 2009

(30) Foreign Application Priority Data

Jan. 12, 2007   (JP) ................................. 2007-004652
Feb. 8, 2007    (JP) ................................. 2007-028711

(51) Int. Cl.
*G06K 9/36*    (2006.01)
*G06K 9/46*    (2006.01)

(52) U.S. Cl.
USPC .......................................... 382/236; 382/233

(58) Field of Classification Search
USPC .................. 382/166, 232, 236, 251, 233; 348/420.1; 375/240.12–240.16, 240.24
See application file for complete search history.

(56) References Cited

U.S. PATENT DOCUMENTS

| | | | |
|---|---|---|---|
| 6,608,935 B2 | 8/2003 | Nagumo et al. | |
| 6,999,511 B1 | 2/2006 | Boice et al. | |
| 2004/0240549 A1* | 12/2004 | Cote et al. | 375/240.15 |
| 2006/0233251 A1* | 10/2006 | Kim et al. | 375/240.12 |
| 2007/0171975 A1* | 7/2007 | Smith et al. | 375/240.13 |
| 2007/0230585 A1 | 10/2007 | Kim et al. | |
| 2008/0089410 A1* | 4/2008 | Lu et al. | 375/240.03 |

FOREIGN PATENT DOCUMENTS

| | | |
|---|---|---|
| EP | 1 906 676 A1 | 4/2008 |
| WO | WO 2005/076613 A1 | 8/2005 |
| WO | WO 2007/010690 A1 | 1/2007 |
| WO | WO 2007/034601 A1 | 3/2007 |

OTHER PUBLICATIONS

Wittmann et al. (Intra-only 4:4:4 Profile for H.264/AVC FRExt, Oct. 14-21, 2005, pp. 1-18).*

(Continued)

*Primary Examiner* — Yubin Hung
(74) *Attorney, Agent, or Firm* — Birch, Stewart, Kolasch & Birch, LLP

(57) ABSTRACT

There are provided an encoding device, a decoding device, an encoding method, and a decoding method that enhance optimality in a case of encoding moving image signals having no sample ratio distinction between color components such as a 4:4:4 format. In a case of conducting compression encoding by inputting digital moving image signals of the 4:4:4 format, there are prepared a first encoding process of encoding three color component signals of the input moving image signals in a common encoding mode, and a second encoding process of encoding the three color component signals of the input moving image signals in respective independent encoding modes. The encoding process is executed by selecting any one of the first encoding process and the second encoding process, and the compression data contains an identification signal for specifying which process is selected.

4 Claims, 15 Drawing Sheets

(56) References Cited

OTHER PUBLICATIONS

Liu et al. ("A low-power dual-mode video decoder for mobile applications", IEEE Communications Magazine, Aug. 2006, pp. 119-126).*

Lin et al. ("An H264-AVC decoder with 4×4 block level pipeline", IEEE International Symposium on Circuits and Systems 2005, vol. 2, pp. 1810-1181).*

Chen et al. ("Architecture Design of H264-AVC Decoder with Hybrid Task Pipelining for high definition videos", International Symposium on circuits and Systems, May 23, 2005, pp. 2931-2934).*

Sekiguchi et al. ("On separate color-plane prediction for direct 4-4-4 video coding", IEEE ICIP, Oct. 8-11, 2006, pp. 1717-1720).*

Wien et al. ("Variable block-size transforms for H264-AVC", IEEE Transaction on Circuits and Systems for Video Technology, vol. 13, No. 7, Jul. 2003, pp. 604-613).*

Kim et al., "Enhancements to RGB coding in H.264/MPEG-4 AVC FRExt", Internet Citation, Apr. 22, 2005, p. 5, XP002439981, Retrieved from the internet.

Wedi et al., "Intra Only 4:4:4 coding for H.264/AVC FRExt", ITU Study Group 16, Video Coding Experts Group, ISO/IEC MPEG & ITU-T VCEG, No. JVT-P088, Jul. 21, 2005, pp. 1-3, XP030006125.

Yu et al., "Advanced 4:4:4 Profile for MPEG 4- Part 10/H.264", Itu Study Group 16, Video Coding Experts Group, No. JVT-P017r1, Oct. 15, 2005, pp. 1-2, XP030006059.

U.S. Appl. No. 11/912,680, filed Jun. 16, 2006, Yoshimi Moriya et al.
U.S. Appl. No. 11/912,563, filed Jun. 19, 2006, Shunichi Sekiguchi et al.
U.S. Appl. No. 11/925,183, filed Oct. 26, 2007, Shunichi Sekiguchi et al.

"Advanced video coding for generic audiovisual services", Series H: Audiovisual and Multimedia Systems: Infrastructure of audiovisual services—Coding of moving video, International Telecommunication Union (ITU), ITU-T Recommendation H.264, Mar. 2005, 341 Pages.

Sekiguchi et al., "Results of Core Experiment on 4:4 :4 Coding (CE5)", Joint Video Team (JVT) of ISO/IEC MPEG & ITU-T VCEG (ISO/IEC JTC1/SC29/WG 11 and ITU-T SG16 Q .6) 20th Meeting: Geneva, Switzerland, Mar. 30, 2006-Apr. 8, 2006, [JVT-S014], pp. 1-20.

Yu et al., "Joint 4:4:4 Video Model (JFVM) 5," Joint Video Team (JVT) of ISO/IEC MPEG & ITU-T VCEG, JVT-U205, 21st Meeting, Hangzhou, China, Oct. 20-27, 2006, pp. 1-14.

Sekiguchi, et al., "Proposal on Advanced 4:4:4 Profiles", Joint Video Team (JVT) of ISO/IEC MPEG & ITU-T VCEG (ISO JTC1SC29/WG11 and ITU-T SG16 Q.6) 21st Meeting: Hangzhou, China, Oct. 20-27, 2006, 5 pages.

US Office Action dated May 7, 2012, for co-pending U.S. Appl. No. 11/926,848.

Sekiguchi et al., "Results of Core Experiment on separate prediction modes for 4:4:4 coding (CE9)", Joint Video Team (JVT) of ISO/IEC MPEG & ITU-T VCEG (ISO/IEC JTC1/SC29/VVG11 and ITU-T SG16 Q.6) 18th Meeting: Bangkok, Thailand, Jan. 14-20, 2006; pp. 1-23.

"Series H: Audiovisual and Multimedia Systems—Infrastructure of audiovisual services—Coding of moving video—Advanced video coding for generic audiovisual services H.264 (2005)," ITU-T Telecommunication Standardization Sector of ITU, 2005. 03, p. 39-41, 65-66.

* cited by examiner

IMAGE DECODING DEVICE AND IMAGE DECODING METHOD FOR DECODING COMPRESSED DATA

BACKGROUND OF THE INVENTION

1. Field of the Invention

The present invention relates to a digital image signal encoding device, a digital image signal decoding device, a digital image signal encoding method, and a digital image signal decoding method used for an image compression encoding technology or a compressed image data transmission technology.

2. Description of the Related Art

An international standard video encoding system such as MPEG or ITU-TH. 26x (e.g., "Information Technology Coding of Audio-Visual Objects Part 10: Advanced Video Coding," ISO/IEC 14496-10, 2003 (hereinafter, referred to as Non-Patent Document 1)) has conventionally been premised on use of a standardized input signal format called a 4:2:0 format. The 4:2:0 format is a format where a color moving image signal of RGB or the like is converted into a luminance component (Y) and two chrominance components (Cb, Cr), and the number of chrominance component samples is reduced to half of luminance components both in horizontal and vertical directions. The chrominance component is inferior to the luminance component in visibility. Accordingly, the conventional international standard video encoding system has been based on the premise that the amount of original information to be encoded is reduced by downsampling chrominance components before encoding is executed as mentioned above. On the other hand, recent increases in resolution and gradation of a video display have been accompanied by studies on a system for performing encoding by maintaining the number of samples equal to that of luminance components without downsampling chrominance components. A format where the numbers of luminance and chrominance component samples are completely equal is called a 4:4:4 format. The conventional 4:2:0 format has been limited to Y, Cb, and Cr color space definitions because of the premise of downsampling of chrominance components. In the case of the 4:4:4 format, however, because there is no sample ratio distinction between color components, R, G, and B can be directly used in addition to Y, Cb, and Cr, and a plurality of color space definitions can be used. An example of a video encoding system targeting the 4:4:4 format is, Woo-Shik Kim, Dae-Sung Cho, and Hyun Mun Kim, "INTER-PLANE PREDICTION FOR RGB VIDEO CODING," ICIP 2004, October 2004 (hereinafter, referred to as Non-Patent Document 2). Non-Patent Document 2 proposes an approach of reducing a size of data which is to be encoded by performing prediction between different color components by employing a correlation remaining between the color components. However, a degree of the correlation between the color components varies depending on types of video contents and color spaces, and the prediction might adversely affects in terms of encoding efficiency. Further, the signal processing is required over a plurality of color components so such a problem arises in that parallel processing efficiency deteriorates in, for example, executing a real time processing of video signals having an extremely high resolution as a digital cinema picture (having 4000×2000 pixels).

SUMMARY OF THE INVENTION

In a high 4:2:0 profile encoding the 4:2:0 format of MPEG-4 advanced video coding (hereinafter, referred to as AVC) of the Non-Patent Document 1, in a macroblock area composed of luminance components of 16×16 pixels, corresponding chrominance components are 8×8 pixel blocks for both Cb and Cr. In motion compensation prediction of the high 4:2:0 profile, block size information which becomes a unit of motion compensation prediction only for the luminance components, reference image information used for prediction, and motion vector information of each block are multiplexed, and motion compensation prediction is carried out for chrominance components by the same information as that of the luminance components. The 4:2:0 format has characteristics in color space definition that almost all pieces of structure information (texture information) of an image is integrated into a luminance component, distortion visibility is lower for a chrominance component than for the luminance component, and a contribution to video reproducibility is small, and prediction and encoding of the high 4:2:0 profile are based on such characteristics of the 4:2:0 format. However, in the case of the 4:4:4 format, three color components equally hold texture information. The system for performing motion compensation prediction in inter prediction mode depending only on one component and based on reference image information and motion vector information is not necessarily an optimal method in the 4:4:4 format where the color components make equal contributions in representing a structure of an image signal.

As described by way of the above related art, it is an object of the present invention to provide an encoding device, a decoding device, an encoding method, and a decoding method that enhance optimality in a case of encoding moving image signals having no sample ratio distinction between color components such as a 4:4:4 format.

According to the present invention, in a case of conducting compression encoding by inputting digital moving image signals of the 4:4:4 format, there are prepared a first encoding process of encoding three color component signals of the input moving image signals in a common encoding mode and a second encoding process of encoding the three color component signals of the input moving image signals in respective independent encoding modes. The encoding process is executed by selecting anyone of the first encoding process and the second encoding process, and the compression data contains an identification signal for specifying which process is selected.

Further, in a case of decoding the compression data of the digital moving image signals of the 4:4:4 format there are prepared a first decoding process of decoding the three color component signals in the common encoding mode, and a second decoding process of decoding the three color component signals in the respective independent encoding modes. The decoding process is executed by decoding the identification signal specifying whether the three color component signals are encoded from the compression data in the common encoding mode or in the respective independent encoding modes, and employing any one of the first decoding process and the second decoding process in accordance with the identification signal.

According to the present invention, in a case of performing encoding that uses multiple color spaces without being limited to the fixed color spaces of Y, Cb, Cr, etc., it is possible to flexibly select inter prediction mode information to be used for the respective color components, and to conduct an optimal encoding process even in a case where there are diverse definitions of the color spaces.

DESCRIPTION OF THE EMBODIMENTS

First Embodiment

Figure 1:
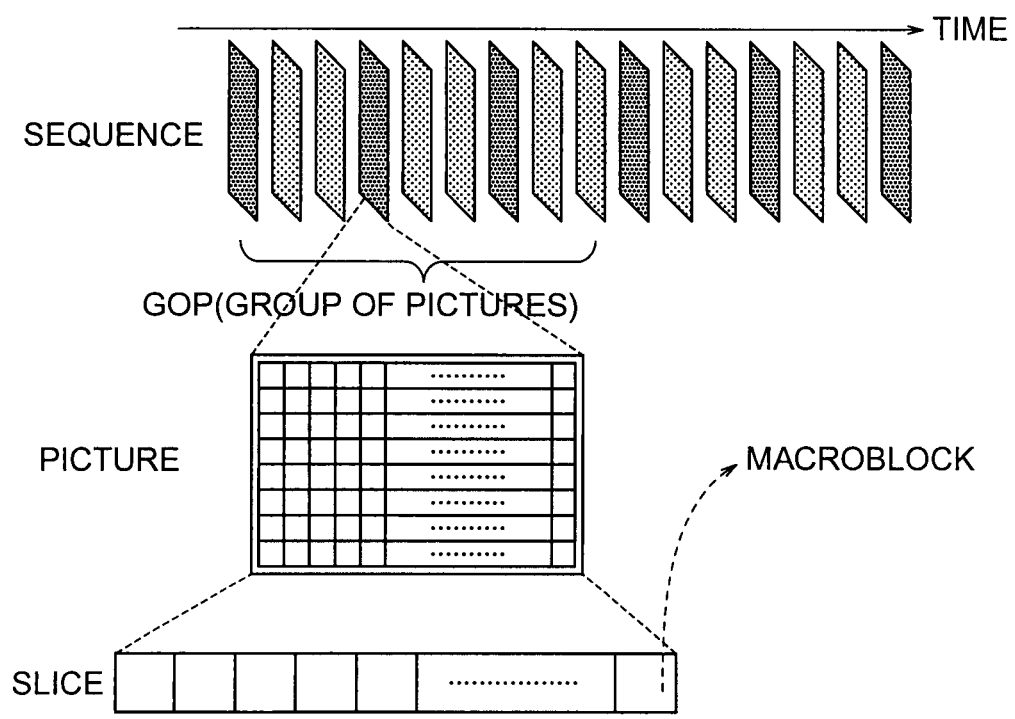
FIG. 1 is an explanatory diagram showing a hierarchical structure of video signals consisting of a sequence, a group of pictures (GOP), a picture, a slice, and a macroblock.

A first embodiment will exemplify an encoding device that efficiently encodes video signals in a 4:4:4 format which is not restricted by a specified color space, and a decoding device that receives encoded bit streams generated by the encoding device decodes the image signals. The encoding device in the first embodiment receives the video signals including three color components such as RGB, XYZ and YCbCr, and outputs the bit streams by conducting compression encoding. As illustrated in FIG. 1, the input video signals are expressed as time-series data of screen information (hereinafter, referred to as picture) defined by a frame-by-frame basis or a field-by-field basis through time-sampling. A data unit, on which the pictures are arranged in time series, is referred to as sequence. The sequence may be divided into some groups of pictures (GOPs). The GOPs are utilized for applications such as assuring execution of decoding from an arbitrary head GOP without depending on other GOPs and assuring a random access to the bit stream. The picture is further divided into square blocks called macroblocks, and video compression is performed on a macroblock basis in a way that applies a prediction/transform/quantization process.

Further, a unit on which a plurality of macroblocks are aggregated is called a slice. The slice is a data unit on which the encoding and decoding can be independently executed in each slice. For example, when processing the video signals having a resolution equal to or higher than a high definition television (HDTV) in real time, the single picture is sliced into a plurality of slices, a period of computing time is reduced by encoding/decoding the respective slices in parallel, and the bit streams are transmitted via a line having a high error ratio. In this case, the slice is utilized for such an application that if a decoded image is disturbed because of a certain slice being destructed as affected by an error, a proper decoding process is restored from the next slice. Generally, the prediction using signal dependency on the neighboring slice cannot be applied at a boundary between the slices, and hence encoding performance declines as the number of slices increases. Such a characteristic, however, exists that flexibility of the parallel processing and the error resilience increase.

Figure 2:
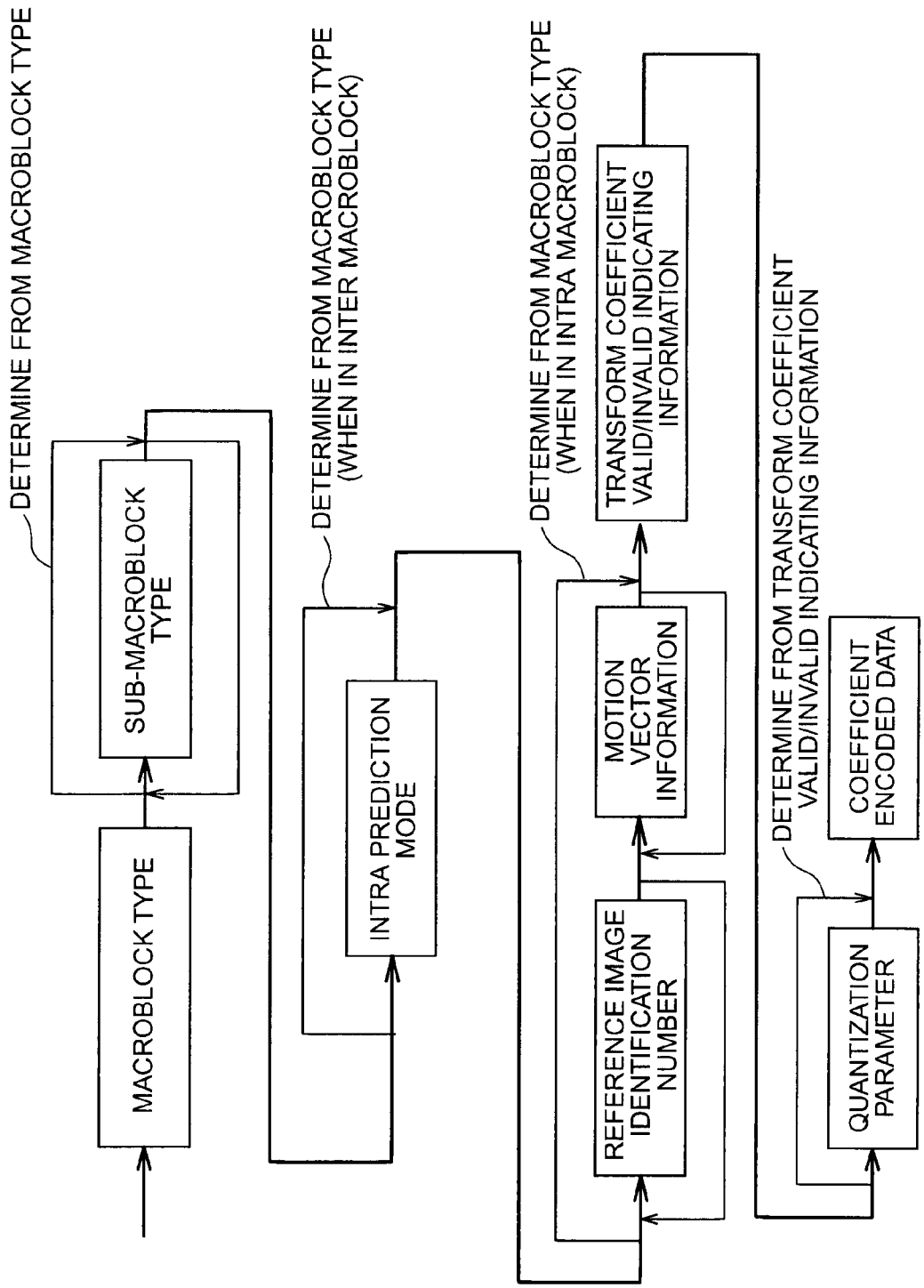
FIG. 2 is an explanatory diagram showing a structure of macroblock encoded data.

The video compression is carried out by applying the prediction/transform/quantization process on the macroblock basis, and therefore the encoded data of the macroblock multiplexed on the bit stream consists of roughly two types of information. One type of information is a category called side information different from the video signal itself such as parameters for a prediction mode, motion prediction information, and quantization, and this category of information is generically called a macroblock header. Another type of information is information of the video signal itself. According to the first embodiment of the present invention, the video signal to be encoded is compressed data of a prediction error signal acquired as a result of conducting the prediction/transform/quantization based on the macroblock header information. The video signal is expressed in a transform-coefficient-quantized format and therefore will be called coefficient-encoded data, hereinafter. FIG. 2 illustrates how the pieces of macroblock encoded data are arranged in the first embodiment. In FIG. 2, the macroblock header contains all items of side information anterior to the coefficient-encoded data, such as the encoding/prediction mode information of a macroblock type/submacroblock type/intra prediction mode etc., the motion prediction information of a reference image identifying number/motion vector etc., a quantization parameter with respect to the transform coefficient, and a valid transform coefficient existence/absence determining flag on an 8×8 block basis.

The first embodiment of the present invention will exemplify: an encoding device that encodes the three color components, selectively based on the common macroblock header or based on the independent macroblock header according to every color component; and a decoding device that executes a video decoding process by receiving the bit streams obtained as an output of the encoding device, and selecting, based on the identification information extracted from the bit stream by decoding the bit stream, whether the three color components have been encoded based on the common macroblock header or based on the independent macroblock header for each color component. The first embodiment of the present invention will particularly exemplify, with reference to specific drawings, configurations and operations of the encoding device and the decoding device that perform encoding and decoding by switching over on a sequence basis an operation of encoding and decoding the three color component signals based on the common macroblock header, and an operation of encoding and decoding those color signals based on the independent macroblock header according to every color component. The encoding device and the decoding device are thus constructed, thereby enabling the color components to be encoded by selecting a case of encoding the color components in accordance with the color space in which the input video signals are defined and with a statistical characteristic of the video signals by use of the common prediction parameters, and a case of encoding the color components by the independent prediction parameters. It is therefore possible to optimally encode the video signals in the 4:4:4 format.

Figure 3:
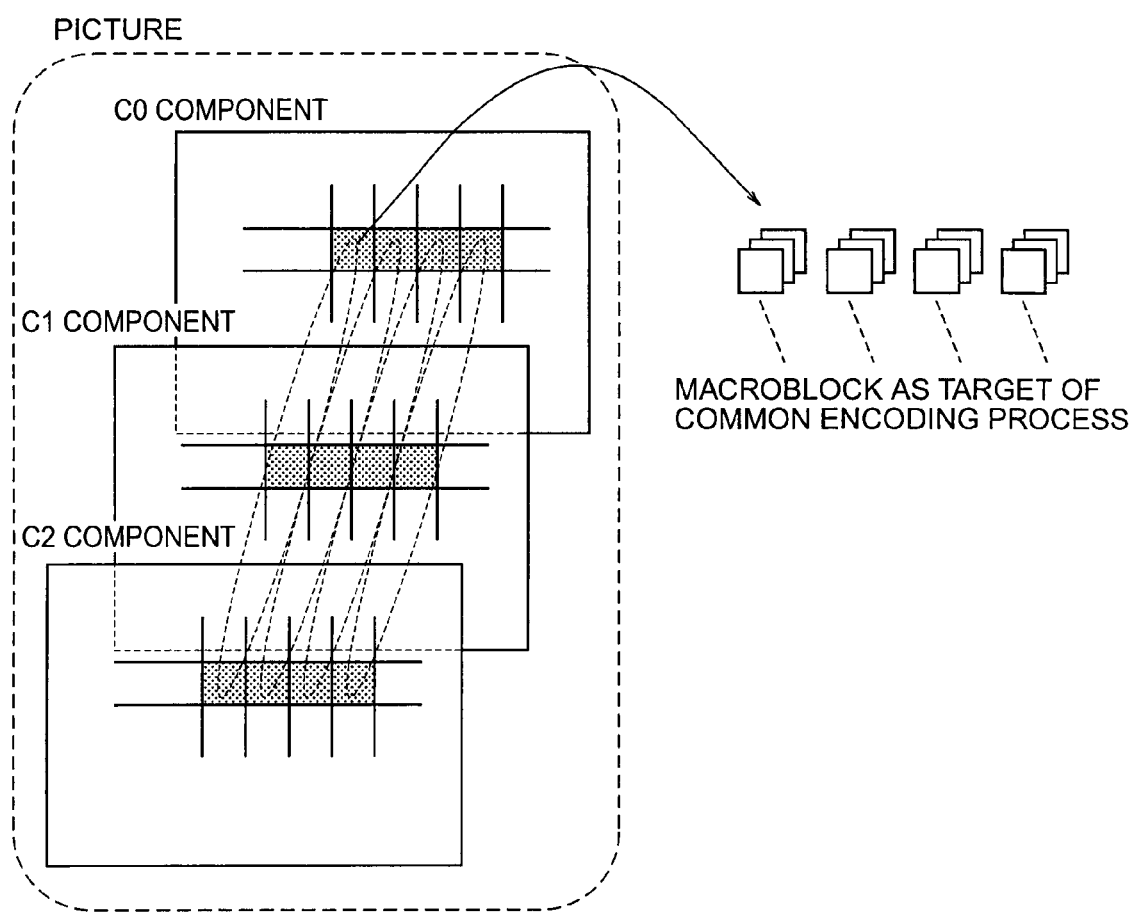
FIG. 3 is an explanatory diagram showing three color components structuring the macroblock in a case of a "common encoding process"
Figure 4:
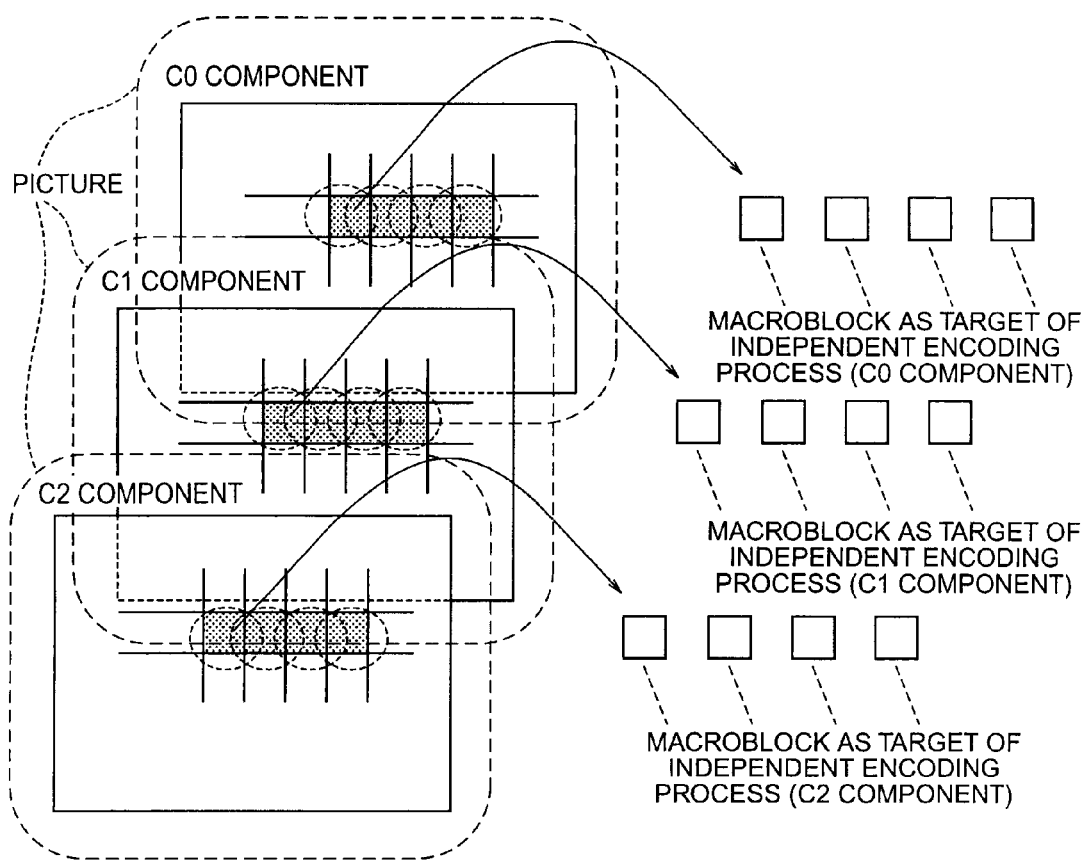
FIG. 4 is an explanatory diagram showing the three color components structuring the macroblock in a case of an "independent encoding process"

Hereinafter, the process of encoding the three color component signals of one frame or one field by the common macroblock header is referred to as "common encoding process," and a process of encoding the three color component signals of one frame or one field by the individual independent macroblock header is referred to as "independent encoding process." Similarly, the process of decoding the image data from the bit streams to which the three color component signals of one frame or one field are encoded by the common macroblock header is referred to as "common decoding process," and the process of decoding the image data from the bit streams to which the three color component signals of one frame or one field are encoded by the individual independent macroblock header is referred to as "independent decoding process." In the common encoding process, the three color components of one frame or one field are collectively defined as one picture and are divided into the macroblocks each consisting of an aggregation of the three color components (FIG. 3). In FIG. 3 and the following description, the three color components are called C0, C1, and C2 components. On the other hand, in the independent encoding process, the input video signals of one frame or one field are separated into the three color components each defined as a picture, and each picture is divided into the macroblocks consisting of the single color component (FIG. 4). In other words, the macroblock as a target of the common encoding process includes samples (pixels) of the three color components of C0, C1, and C2, but, the macroblock as a target of the independent encoding process includes only the samples (pixels) of any one component of the C0, C1, and C2 components.

Figure 5:
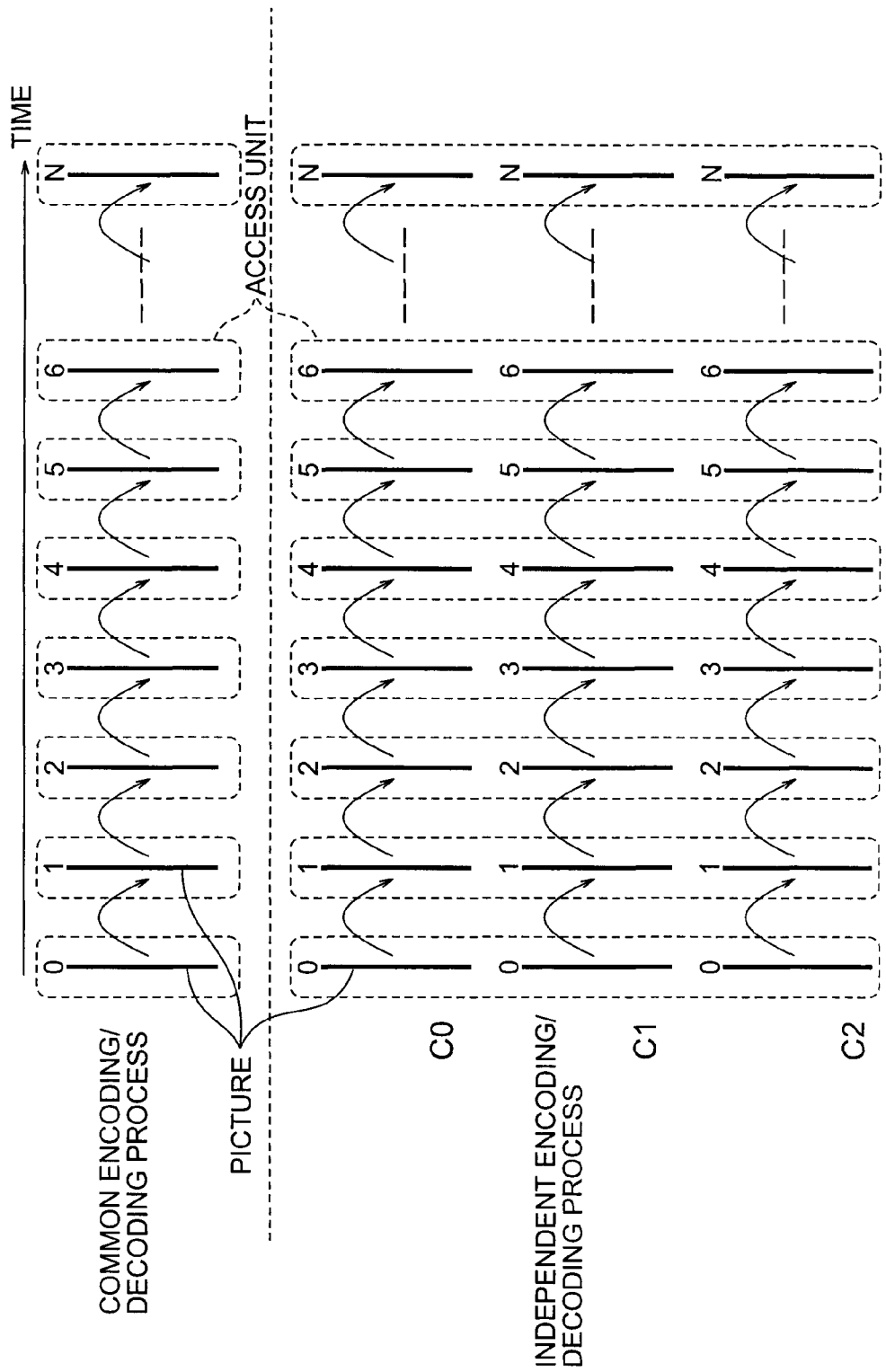
FIG. 5 is an explanatory diagram showing a time-directional motion prediction reference relation between the pictures in "common encoding" and "independent encoding"

FIG. 5 illustrates a motion prediction reference relation in a time direction between the pictures in the encoding device/decoding device according to the first embodiment of the present invention. In this example, the data unit indicated by a bold vertical line represents the picture, and a relation between the picture and an access unit is indicated by a dotted line. In the case of the common encoding/decoding process, as described above, one picture is the data representing the video signals consisting of the aggregations of the three color components. In the case of the independent encoding/decoding process, one picture is the video signals consisting of any one color component. The access unit is a minimum data unit for providing time stamp aiming at, for example, synchronizing the video signals with audio/sound information etc. In the case of the common encoding/decoding process, one access unit includes the data for one picture. On the other hand, in the case of the independent encoding/decoding process, one access unit includes three pictures. This is because, in the case of the independent encoding/decoding process, regeneration video signals for one frame are not obtained till the pictures of all the three color components at the same display time become available. Note that numbers attached to the top of the respective pictures indicate a time-directional encoding/decoding process sequence (corresponding to frame_num of AVC) of the pictures. In FIG. 5, an arrow between the pictures indicates a reference direction of the motion prediction. To be specific, in the case of the independent encoding/decoding process, the motion prediction reference between the pictures included in the same access unit and the motion prediction reference between the different color components are not performed but the encoding/decoding process are performed while performing the prediction reference by limiting the pictures of the color components of C0, C1, and C2 to the signals of the same single color component. With this structure, in the case of the independent encoding/decoding process according to the first embodiment of the present invention, each color component can be encoded and decoded without depending on the encoding/decoding process of other color components at all, thereby facilitating the parallel processing.

The identification information indicating whether the encoding based on the common encoding process is carried out or the encoding based on the independent encoding process is carried out will hereinafter be referred to as common encoding/independent encoding identification signal 1.

Figure 6:
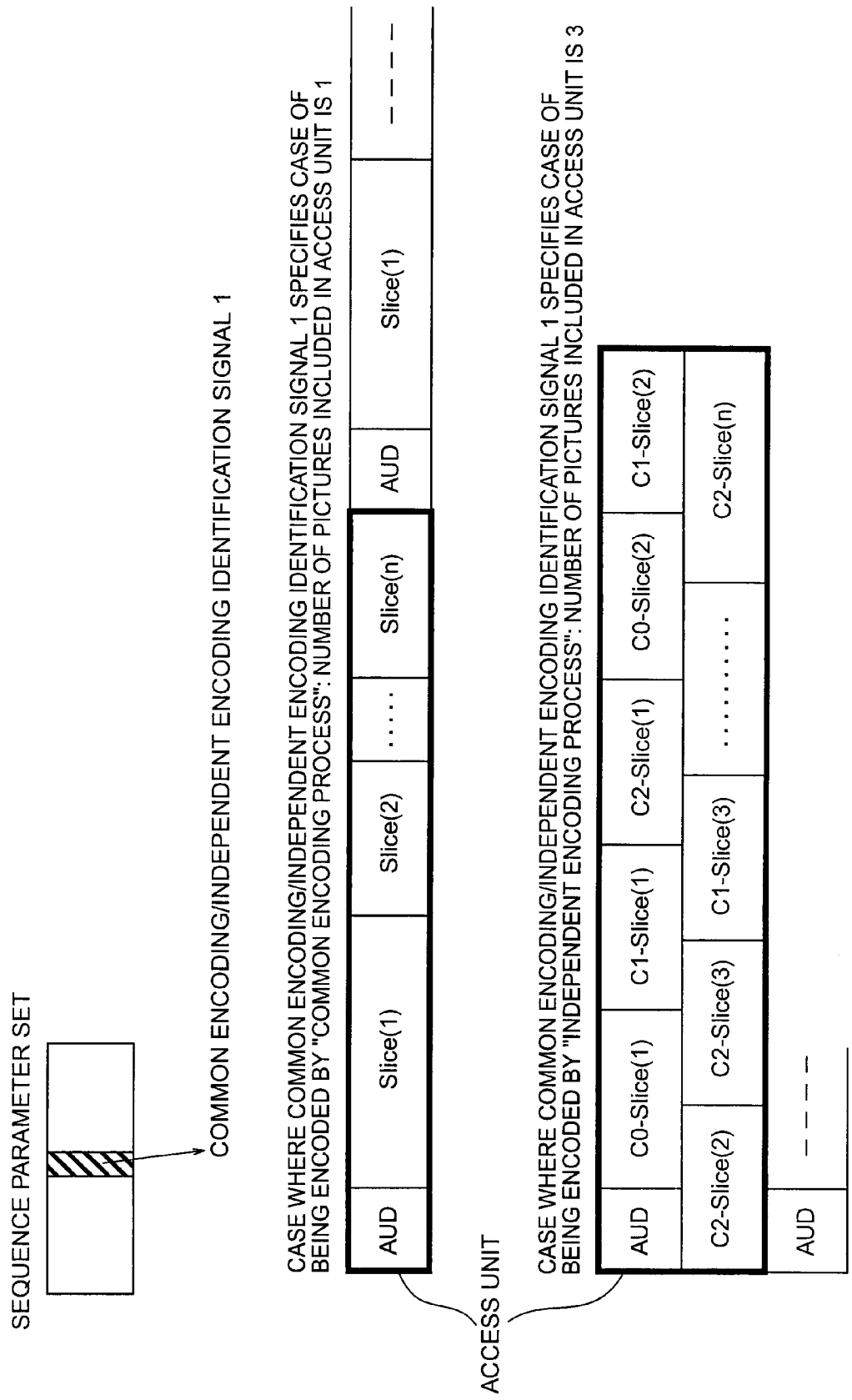
FIG. 6 is an explanatory diagram showing an example structure of a bit stream according to a first embodiment of the present invention.

FIG. 6 shows one example of a structure of the bit stream generated by the encoding device according to the first embodiment of the present invention and serving as a target of a receiving/decoding process by the decoding device according to the first embodiment. FIG. 6 illustrates the structure of the bit stream from the sequence to a slice level. First, a higher-order header of the sequence level (sequence parameter set in the case of AVC) is multiplexed on the common encoding/independent encoding identification signal 1. AUD represents an Access Unit Delimiter NAL unit which is a unique NAL unit for identifying an access unit delimiter in the AVC. The AUD is information specifying the head of the access unit and can be, without depending on the data format of the AUD of the AVC, applied to an arbitrary data format if conformable to its purpose. For example, the AUD corresponds to a picture start code according to the MPEG-2 standards and to a VOP start code according to the MPEG-4 standards.

When the common encoding/independent encoding identification signal 1 indicates "common encoding process," the access unit contains the encoded data for one picture. The picture at this time is the data representing the video signals for one frame or one field, which consist of the aggregations of the three color components as described above. The actual video encoded data is multiplexed on the bit stream on the slice basis of FIG. 1. On the other hand, when the common encoding/independent encoding identification signal 1 indicates the "independent encoding process," one picture is the video signal for any one color component in one frame or one field, and one access unit includes the three pictures. In this case, the slice is defined with respect to the picture of each color component.

Figure 7:
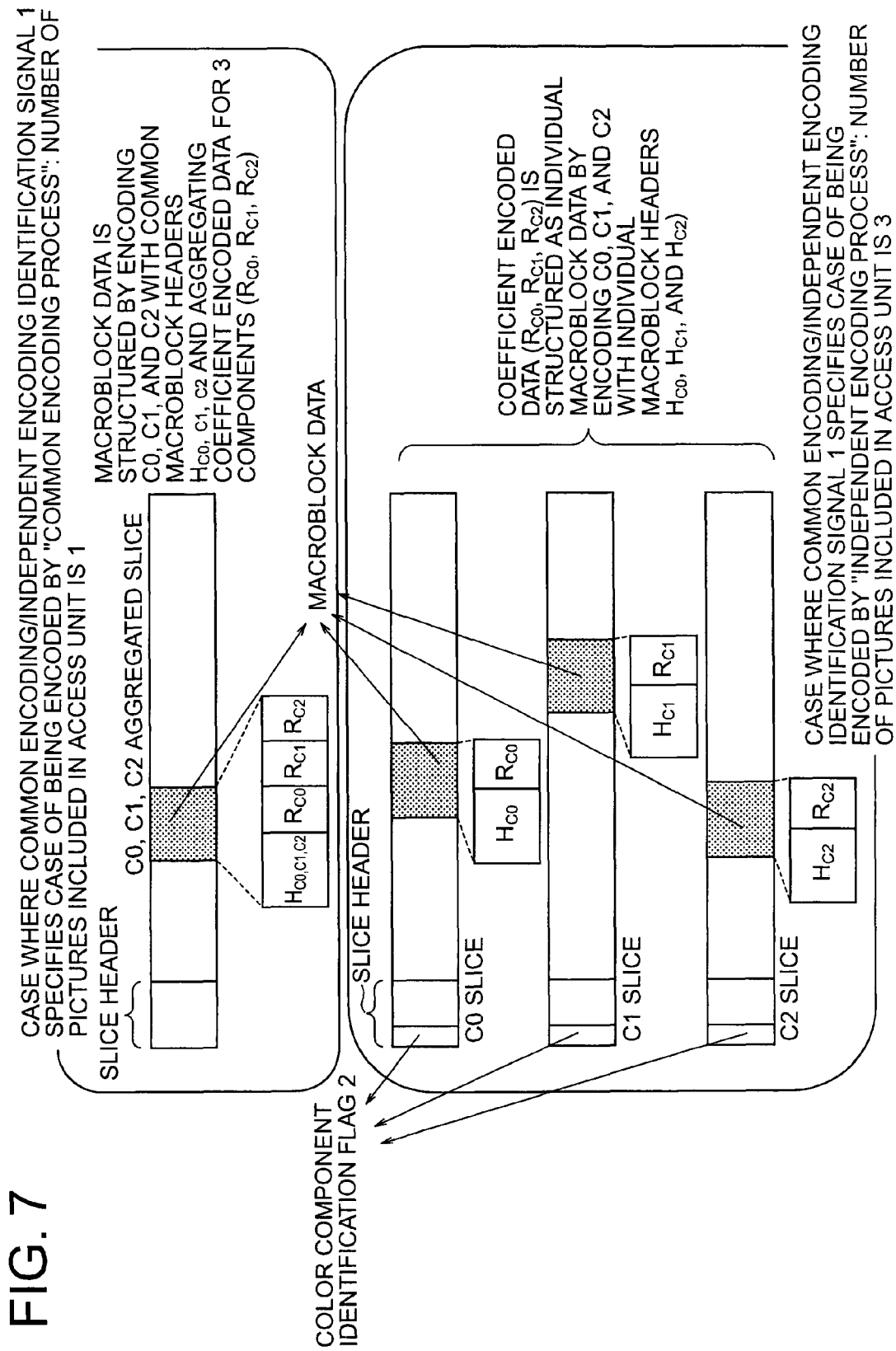
FIG. 7 is an explanatory diagram showing an example structure of the bit stream of slice data according to the first embodiment of the present invention.

FIG. 7 illustrates structures of the bit streams of the slice data in the case of the common encoding process and in the case of the independent encoding process, respectively. In the bit stream encoded by the independent encoding process, in order to attain an effect that will be described later, a color component identification flag 2 (color_channel_idc) is provided to a header field at the head of the slice data such that the slice is distinguishable as to which color component picture the slice data received by the decoding device belongs to. The slices having the same values are grouped by identification flag 2. In other words, none of encoding/decoding dependency (e.g., motion prediction reference, context modeling/generation probability learning of CABAC, etc.) is provided between the slices having different values of the color component identification flag 2. This rule ensures the independence of the individual picture within the access unit in the case of the independent encoding process. Further, frame num (encoding/decoding processing sequence of the picture to which the slice belongs) multiplexed on each slice header takes the same value in the full-color component pictures within one access unit.

Figure 8:
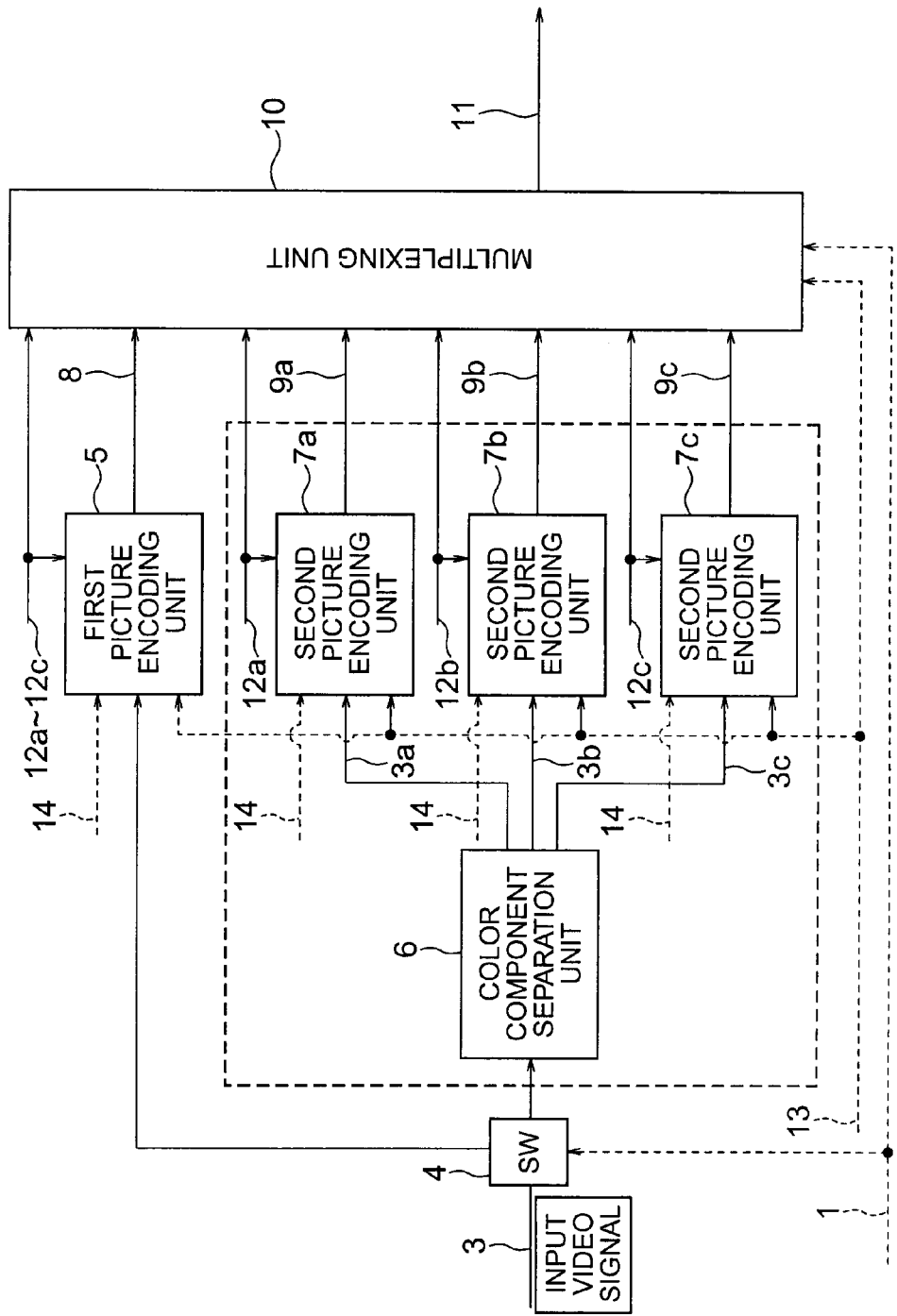
FIG. 8 is a schematic structural diagram of an encoding device according to the first embodiment of the present invention.

FIG. 8 illustrates an outline of the configuration of the encoding device according to the first embodiment of the present invention. In FIG. 8, a first picture encoding unit 5 executes the common encoding process, and second picture encoding units 7a to 7c (provided for the three color components) execute the independent encoding process.

Input video signals 3 are supplied to any one of the first picture encoding unit 5, a color component separating unit 6, and the second picture encoding units 7a to 7c via a switch (SW) 4. The switch 4 is activated by the common encoding/independent encoding identification signal 1 and supplies the input video signals 3 to a designated path.

The common encoding/independent encoding identification signal 1 is a signal that, when the input video signal takes the 4:4:4 format, is multiplexed on the sequence parameter set and selects the common encoding process and the independent encoding process on the sequence basis. The common encoding/independent encoding identification signal 1 is multiplexed on the sequence parameter set in a bit stream 11 as information that designates which process has been employed to generate the bit stream 11. This structure enables the decoding device, which receives the bit stream 11, to execute the common decoding process when the bit stream 11 is generated by use of the common encoding process by decoding the common encoding/independent encoding identification signal 1 in the sequence parameter set and checking the value thereof, and to execute the independent decoding process when the bit stream 11 is generated by use of the independent encoding process.

If the common encoding/independent encoding identification signal 1 indicates "common encoding process," in the first picture encoding unit 5, the input video signals 3 are divided into the macroblocks in the form of aggregating the samples of the three color components as illustrated in FIG. 3, the encoding process on the macroblock basis is executed, and the encoded data is output as a bit stream 8. The encoding process by the first picture encoding unit 5 will be described later.

If the common encoding/independent encoding identification signal 1 designates "independent encoding process," the input video signals 3 are separated into the signals of the color components of C0, C1, and C2 by the color component separating unit 6 and are supplied to the second picture encoding units 7a to 7c corresponding to the respective color components. In the second picture encoding units 7a to 7c, the signals separated according to every color component are divided into the macroblocks taking the format shown in FIG. 4, and the encoding process on the macroblock basis is executed, whereby the signals are output as bit streams 9a to 9c. The encoding process by the second picture encoding units 7a to 7c will be described later.

In a multiplexing unit 10, the common encoding/independent encoding identification signal 1 is added to the sequence parameter set and is multiplexed on the bit stream 11. In the multiplexing unit 10, any one of the bit stream 8 and the bit streams 9a to 9c, corresponding to the value of the common encoding/independent encoding identification signal 1, is selected, and the selected bit stream is multiplexed on the bit stream 11.

Further, though the details will be described later, quantization weighting coefficient information (12a to 12c) for quantization parameters used in a picture encoding process, especially a quantization/inverse quantization process, is provided for every three color components and input to the respective picture encoding units in which the quantization process matching a characteristic of every color component is executed. The quantization weighting coefficients 12a to 12c are also sent to the multiplexing unit 10 to be multiplexed on the sequence parameter set in order for the decoding device to use the same values of the coefficients 12a to 12c as those employed in the encoding process.

Further, an intra only encoding instruction signal 13 is input to the picture encoding units 5 and 7a to 7c, thereby controlling the encoding process. The intra only encoding instruction signal 13 is a signal for instructing whether the picture encoding unit executes the time-directional prediction process based on a motion compensation prediction. If the intra only encoding instruction signal 13 indicates "intra only encoding," the encoding closed within the picture is carried out with respect to all of the pictures of the input video signals 3 without performing the time-directional prediction based on the motion compensation prediction. Further, at this time, an intra loop deblocking filter is simultaneously disabled (details will be described later) within the picture encoding unit. If the intra only encoding instruction signal 13 indicates "non intra only encoding," an inter-encoding process using an intra picture/inter-picture correlation is executed with respect to the pictures of the input video signals 3 by also employing the time-directional prediction based on the motion compensation prediction. The multiplexing unit 10 adds the intra only encoding instruction signal 13 to the sequence parameter set and thus multiplexes the sequence parameter set with the bit stream 11. With this multiplexing, the decoding device receiving the bit stream 11 decodes the intra only encoding instruction signal 13 contained in the sequence parameter set and checks its value, whereby it can be recognized whether the bit stream 11 is intra only-encoded or not. Therefore, if the bit stream 11 is intra only-encoded, the intra loop deblocking filter process can be made unnecessary, and a computing amount of the decoding device can be reduced.

The intra encoding process of the AVC requires approximately a two-fold to ten-fold encoding amount as compared with the inter-encoding process, and hence the data encoded by "intra only encoding" has a data size that is considerably larger than the data encoded by "non intra only encoding."

The conventional decoding device provides an upper limit to the data size enabling the decoding process to be executed, and reduces an operation speed and a required memory size in the device to the greatest possible degree, thereby scheming to stabilize the operation. Therefore, in the case of "intra only encoding," there is a possibility that the data exceeding the set upper limit might be input, resulting in a problem of being disabled to determine whether the stable operation can be performed or not.

This being the case, a flag for showing whether the encoded data is less than or exceeds a predetermined amount, is provided in the sequence parameter set. A determining process is done based on the flag, and, if the encoded data is smaller than the predetermined amount, even the conventional decoding device is assumed to be capable of processing and therefore the decoding process is executed. If the encoded data exceeds the predetermined amount, it is assumed that the conventional decoding device may not execute the stable process, and consequently a process such as alarming can be taken.

Moreover, image size information 14 of the input video signal 3 is input to the picture encoding units 5 and 7a to 7c, and is configured to control the encoding process. The image size information 14 is information representing the number of intra picture macroblocks of the input video signal 3, which is controlled to set an upper limit value of the number of the macroblocks contained in the slice if a value of the information 14 is larger than a predetermined threshold value, and to prevent the slice from containing a lager number of macroblocks than the upper limit value. The image size information 14 is added to the sequence parameter set, and the sequence parameter set is multiplexed on the bit stream 11. With this multiplexing, if the picture size of the input video signal 3 is large (i.e., a spatial resolution is high), both of the encoding device and the decoding device can specify unit which can be a parallel processed and can assign tasks smoothly.

Hereinafter, the operations of the first and second picture encoding units will be explained in detail.

Outline of Operation of First Picture Encoding Unit

Figure 9:
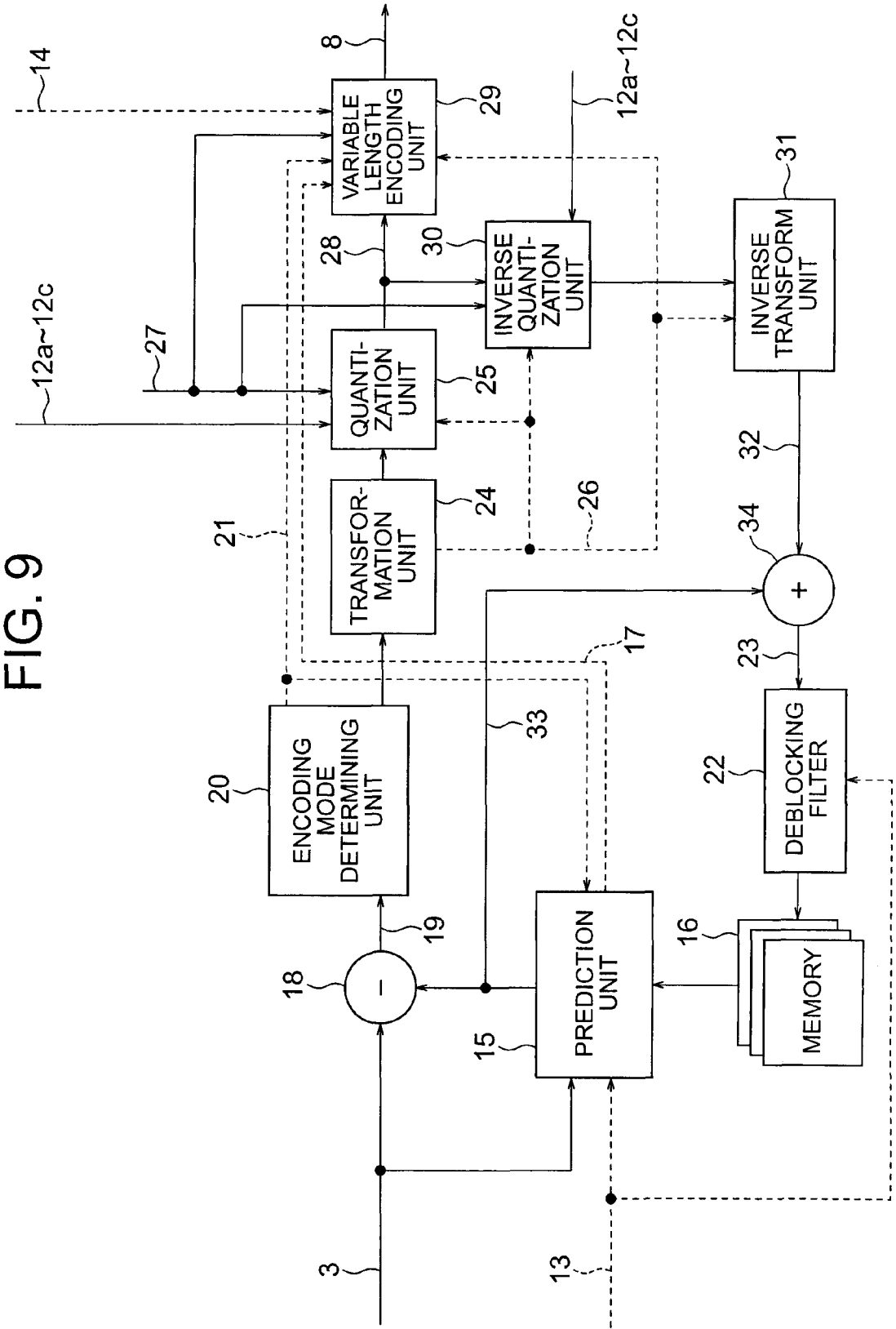
FIG. 9 is an internal configuration diagram of a first picture encoding unit 5.

FIG. 9 illustrates an internal configuration of the first picture encoding unit 5. In FIG. 9, it is assumed that the input video signal 3 takes the 4:4:4 format and is encoded on the macroblock basis in the format of FIG. 3, where the macroblock consists of the aggregation of the three color components. The internal processing differs depending on the value of the intra only encoding instruction signal 13.

(1) Case of Intra Only Encoding Instruction Signal 13 Indicating "Non Intra Only Encoding"

The prediction unit 15 selects a reference image from among motion compensation prediction reference image data stored in the memory 16, and executes a motion compensation prediction process on the macroblock basis. The memory 16 is stored with a plurality of pieces of reference image data each consisting of the three color components over a plurality of points of time of the most recent past or the past and the future. The prediction unit 15 performs the motion prediction by selecting an optimal reference image on the macroblock basis from among those reference images. As to the allocation of the reference image data in the memory 16, the data may be stored separately plane-sequentially according to every color component, and the samples of the respective color components may also be stored dot-sequentially. Seven types of block sizes subjected to the motion compensation prediction are provided. First, as illustrated in FIGS. 10(a) to 10(d), any size of 16×16, 16×8, 8×16, and 8×8 is selected on the macroblock basis. Further, when the 8×8 size is selected, as illustrated in FIGS. 10(e) to 10(h), any size of 8×8, 8×4, 4×8, and 4×4 is selected for every 8×8 block. In the common encoding process executed by the first picture encoding unit 5, the motion compensation prediction block size common to the three color components is selected and applied.

Figure 10:
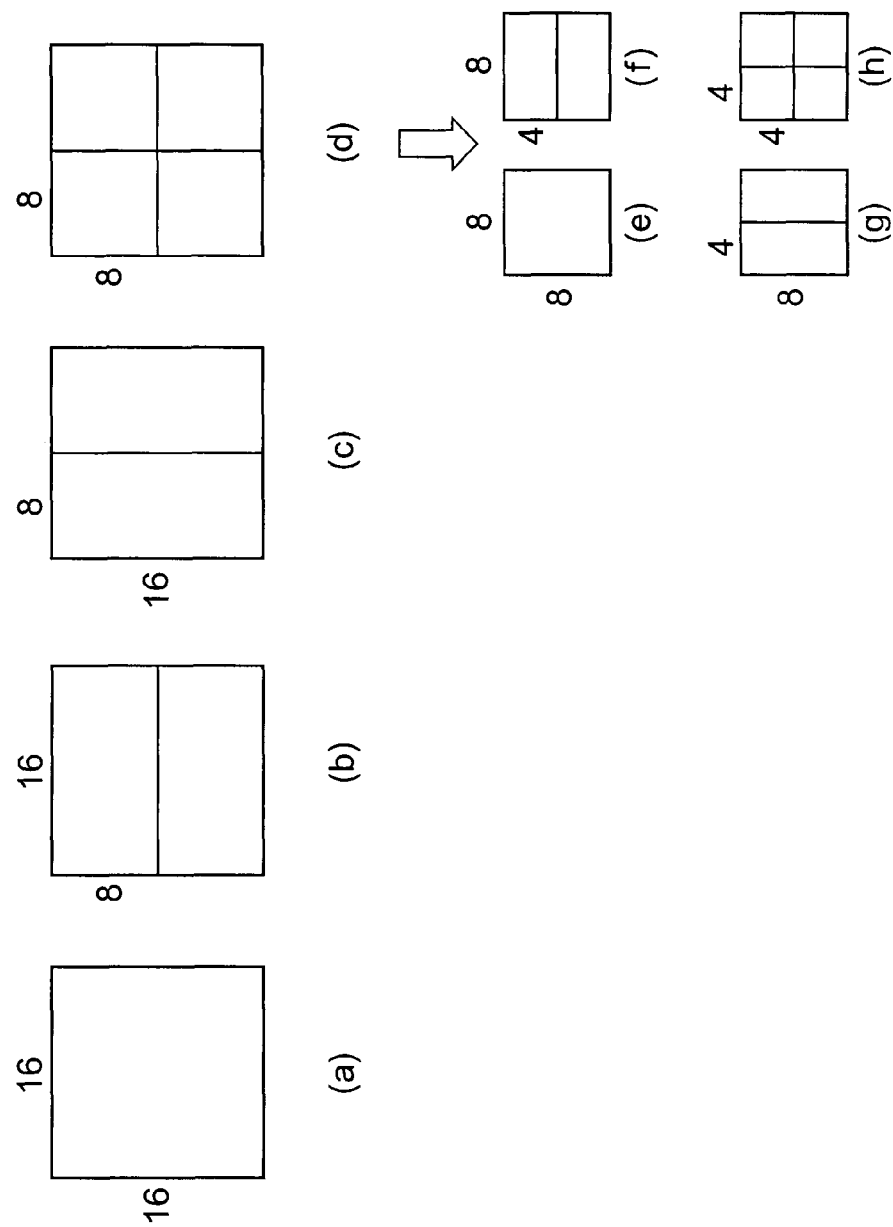
FIGS. 10(a) to 10(h) are an explanatory diagrams showing seven types of block sizes with each of which motion compensation prediction is conducted.

The prediction unit 15 executes the motion compensation prediction process on the macroblock basis with respect to all or part of the block sizes/sub-block sizes of FIG. 10, a motion vector in a predetermined search range, and one or more pieces of usable reference images, thereby outputting prediction overhead information 17 containing the motion vector and a reference image index used for the prediction and a predicted image 33. A subtracter 18 obtains a prediction difference signal 19 for every block that serves as a motion compensation prediction unit from the predicted image 33 and the input video signal 3. an encoding mode determining unit 20 carries out a selecting process from the prediction process executed by the prediction unit 15, and outputs the selected prediction difference signal 19 and a macroblock type/sub-macroblock type 21. All items of macroblock header information such as the macroblock type, the sub-macroblock type, the reference image index, and the motion vector are determined as the header information common to the three color components. The macroblock header information is used in common for encoding the three color components and is multiplexed on the bit stream 8. In a case of evaluating the optimality of the prediction efficiency, for the purpose of restraining the computing amount, only a prediction error amount for a certain predetermined color component (e.g., the G-component of R, G, and B, and the Y-component of Y, Cb, and Cr) may also be evaluated, and the prediction error amounts for all of the color components may also be comprehensively evaluated in order to acquire the optimal prediction performance, though the computing amount is increased.

Similarly, the prediction unit 15 executes the intra prediction. When the prediction unit 15 executes the intra prediction, intra prediction mode information is output to the signal 17.

Hereinafter, unless there is no particular distinction between the intra prediction and the motion compensation prediction, the signal 17 is called the prediction overhead information. Note that the reference image data for conducting the intra prediction involves using a local decoded image 23 before being subjected to the process of a deblocking filter 22 (though not illustrated, the local decoded image 23 is used as the reference image data for the intra prediction and is therefore temporarily stored in the prediction unit 15 and the like). An intra prediction mode common to the three color components is selected and applied to the common encoding process executed by the first picture encoding unit 5. As for the intra prediction, the prediction error amount only for the predetermined color component may be evaluated, and the prediction error amounts for all of the color components may also be comprehensively evaluated. Finally, the encoding mode determining unit 20 selects, by evaluating in terms of the prediction efficiency or the encoding efficiency, whether the macroblock type is set to the intra prediction or the inter prediction.

A transformation unit 24 transforms the prediction difference signal 19 and outputs the transformed signal as a transform coefficient to a quantization unit 25. In this case, a block size serving as a unit for conducting the transform may be selected from among a plurality of candidate sizes such as 4×4 and 8×8. In the case of making the transformation block size selectable, the block size selected when encoded is reflected in a value of the transformation block size designation flag 26, and the flag 26 is multiplexed on the bit stream 8. The quantization unit 25 quantizes the transform coefficient to be input on the basis of the quantization parameter 27 and the quantization weighting coefficients 12a to 12c, and outputs the quantized result as a quantized transform coefficient 28 to a variable length encoding unit 29 and a inverse quantization unit 30.

The process of the quantization unit 25 will be described. The transform coefficient transformed into a signal of a frequency domain from that of a spatial domain by the transformation unit 24 is separated into a low frequency domain where distortion is easy to be caught by eyes in terms of visual characteristics of a man and a high frequency domain where the distortion is hard to be detected. Thus, every frequency domain is weighted. Fine quantization is conducted in the low frequency domain, while coarse quantization is conducted in the high frequency domain, whereby the quantization process adapted to the visual characteristics of the man can be realized. The quantization weighting coefficients 12a to 12c are the weighting parameters given in every frequency domain. 16 weighting parameters are used for transforming the 4×4 block size, and 64 weighting parameters are used for transforming the 8×8 block size. As described above, the quantization weighting coefficients 12a to 12c are multiplexed on the sequence parameter set. In the case of executing the "common encoding process," however, the same quantization weighting coefficient is used for the three color components. Accordingly, there is no necessity of multiplexing the three coefficients 12*a*, 12*b*, and 12*c*, and it is sufficient to multiplex only one coefficient. The quantization unit 25 executes the quantization process in which the transform coefficients of the three color components are weighted by use of the quantization weighting coefficients 12*a* to 12*c*, thereby obtaining the quantized transform coefficient 28.

The quantized transform coefficient 28 for the three color components is entropy-coded by the variable length encoding unit 29 using measures such as Huffman coding and arithmetic coding.

Further, the quantized transform coefficient 28 is restored to a local decoded prediction difference signal 32 via the inverse quantization unit 30 and a inverse transform unit 31. Then, in an adder 34, the signal 32 is added with a prediction image 33 generated based on the selected macroblock type/sub-macroblock type 21 and the prediction overhead information 17, thereby generating the local decoded image 23. The local decoded image 23 is, after being subjected to a block distortion removing process in the deblocking filter 22, stored in the memory 16 in order to be employed for the subsequent motion compensation prediction process.

The quantized transform coefficient 28, the macroblock type/sub-macroblock type 21, the prediction overhead information 17, and the quantization parameter 27, which are input to the variable length encoding unit 29, are arranged and shaped according to a predetermined syntax of the macroblock encoded data, and are packetized (also called NAL unitization in the AVC) on the unit of the slice data consisting of one macroblock or the aggregation of the plurality of macroblocks in the format shown in FIG. 3. Then, the data packets are output as the bit stream 8.

(2) Case of Intra Only Encoding Instruction Signal 13 Indicating "Intra Only Encoding"

The prediction unit 15 executes only the intra prediction process described in the item (1). When the intra prediction is executed, the intra prediction mode information is output to the prediction overhead information 17. Note that the reference image data for conducting the intra prediction involves using the local decoded image 23 before being subjected to the process of the deblocking filter 22 (though not illustrated, the local decoded image 23 is used as the reference image data for the intra prediction and is therefore temporarily stored in the prediction unit 15 and the like). The intra prediction mode common to the three color components is selected and applied to the common encoding process executed by the first picture encoding unit 5. The encoding mode determining unit 20 selects the intra prediction mode by evaluating in terms of the prediction efficiency or the encoding efficiency.

The encoding mode determining unit 20 outputs the selected prediction difference signal 19 to the transformation unit 24. The transformation unit 24 transforms the prediction difference signal 19 to be input and outputs the transformed signal as a transform coefficient to the quantization unit 25. In this case, the block size serving as the unit for conducting the transform may be selected from among the plurality of candidate sizes such as 4×4 and 8×8. The AVC is configured so that a prediction target block of the intra prediction mode is adjusted to the transformation block size. In the case of making the transformation block size selectable, the block size selected when encoded is reflected in the value of the transformation block size designation flag 26, and the flag 26 is multiplexed on the bit stream 8. The quantization unit 25 quantizes the transform coefficient to be input on the basis of the quantization parameter 27 and the quantization weighting coefficients 12*a* to 12*c*, and outputs the quantized result as the quantized transform coefficient 28 to the variable length encoding unit 29. The example of the process is as described above.

The quantized transform coefficient 28 for the three color components is entropy-coded by the variable length encoding unit 29 using the measures such as Huffman coding and arithmetic coding.

Further, the quantized transform coefficient 28 is restored to the local decoded prediction difference signal 32 via the inverse quantization unit 30 and the inverse transform unit 31. Then, in the adder 34, the signal 32 is added with the prediction image 33 generated based on the prediction overhead information 17, thereby generating the local decoded image 23. If the intra only encoding instruction information 13 indicates "intra only encoding," the motion compensation prediction is not executed, and hence the deblocking filter 22 executes neither the process nor the writing of the data as the reference image to the memory 16. With this structure, access to the memory and the arithmetic operation needed for the process of the deblocking filter can be reduced.

The quantized transform coefficient 28, the macroblock type/sub-macroblock type 21 (fixed to the intra mode), the prediction overhead information 17, and the quantization parameter 27, which are input to the variable length encoding unit 29, are arranged and shaped according to the predetermined syntax of the macroblock encoded data, and are packetized (also called the NAL unitization in the AVC) on the unit of the slice data consisting of one macroblock or the aggregation of the plurality of macroblocks in the format shown in FIG. 3. Then, the data packets are output as the bit stream 8.

Note that the number of the macroblocks included in the slice is restricted not by the value of the intra only encoding instruction information 13 but by the image size information 14. The image size information 14 is input to the variable length encoding unit 29. The variable length encoding unit 29 sets, based on the image size information 14, an upper limit value of the number of the macroblocks included in the slice. The variable length encoding unit 29 counts the number of the encoded macroblocks in advance, and, when the number of the macroblocks included in the slice reaches the upper limit value, closes the packet of the slice data. Subsequent macroblocks are packetized as new slice data.

Moreover, the first picture encoding unit 5 according to the first embodiment of the present invention does not provide the color component identification flag 2 in the slice data because of its being recognizable from the common encoding/independent encoding identification signal 1 that all pieces of the slice data in the sequence can be defined as C0, C1, and C2 aggregated slices (i.e., the slices each consisting of the aggregation of the three color component information).

Outline of Operation of Second Picture Encoding Unit

Figure 11:
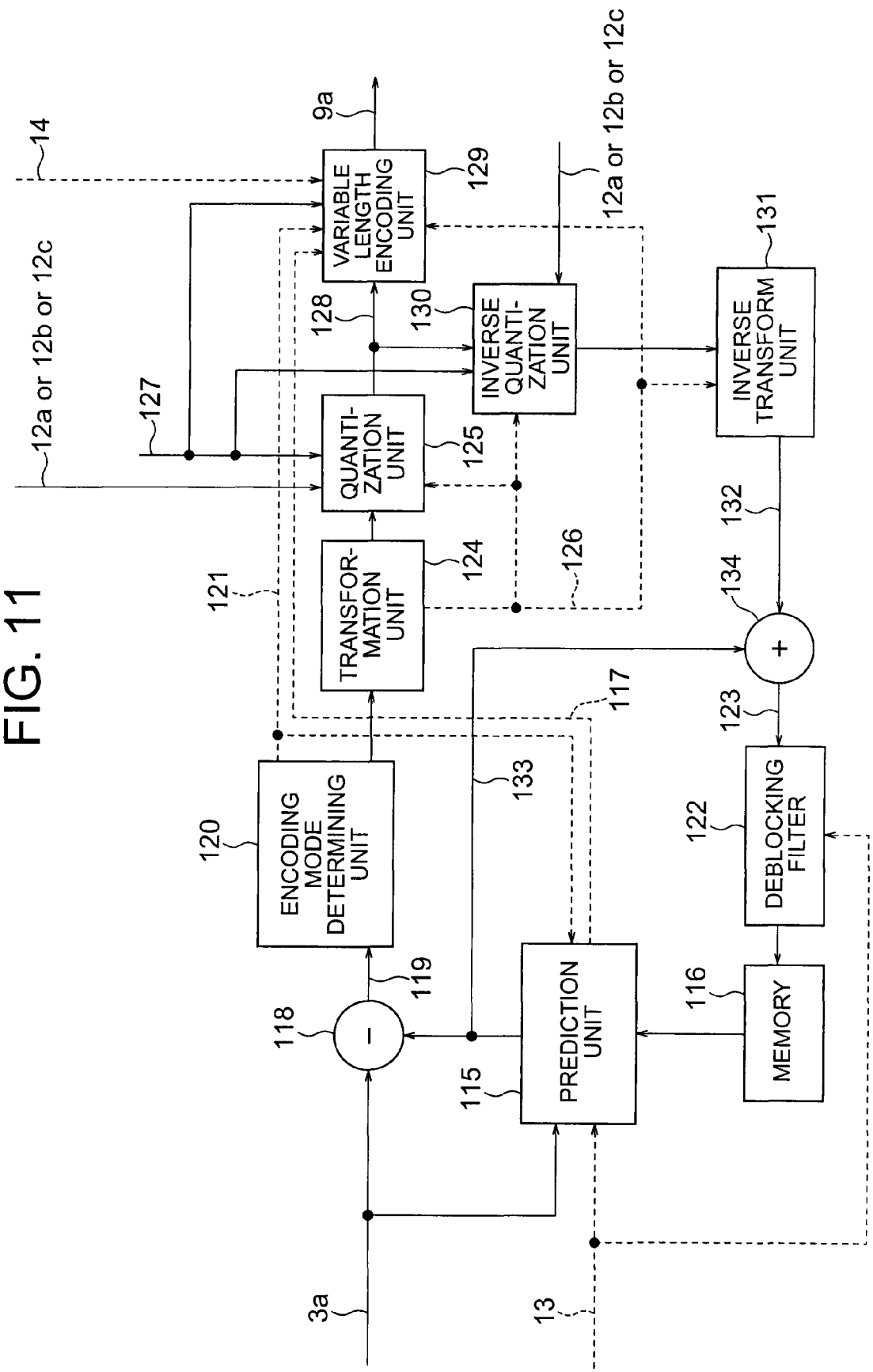
FIG. 11 is an internal structural diagram of a second picture encoding unit 7.

FIG. 11 illustrates an internal configuration of the second picture encoding unit 7*a*. In FIG. 11, it is assumed that an input video signal 3*a* is input on the macroblock basis, the macroblock consisting of the samples of the C0 component in the format shown in FIG. 4. The second picture encoding units 7*b*, 7*c* have absolutely the same internal configuration except for handling input video signals 3*b* (C1 component) and 3*c* (C2 component) in place of the input video signal 3*a*. Therefore, an operation of the second picture encoding unit will hereinafter be described by way of a representative example of the second picture encoding units 7*a*.

(3) Case of Intra Only Encoding Instruction Signal 13 Indicating "Non Intra Only Encoding"

A prediction unit 115 selects a reference image from among motion compensation prediction reference image data stored in a memory 116, and executes a motion compensation prediction process on the macroblock basis. The memory 116 can be stored with a plurality of pieces of reference image data each consisting of the single color component over a plurality of points of time such as the most recent past or the past and the future. The prediction unit 115 performs the motion prediction by selecting an optimal reference image on the macroblock basis from among those reference images. Note that each of the second picture encoding units 7a to 7c can be configured so as to employ only the reference image data for each target color component and not to access the reference image data of other color components. Hence, the memory 116 may take not the configuration of providing the memories for the three color components, respectively, but a configuration of aggregating the memories into one memory. Further, in the sequence where the second picture encoding units 7a to 7c execute the encoding process, the first picture encoding unit 5 does not operate, and therefore the memory 116 is configured to be shared with the memory 16. Seven types of block sizes subjected to the motion compensation prediction are provided. First, as illustrated in FIGS. 10(*a*) to 10(*d*), any size of 16×16, 16×8, 8×16, and 8×8 is selected on the macroblock basis. Further, when the 8×8 size is selected, as illustrated in FIGS. 10(*e*) to 10(*h*), any size of 8×8, 8×4, 4×8, and 4×4 is selected for every 8×8 block. In the independent encoding process executed by the second picture encoding unit 7, the motion compensation prediction block sizes for the C0 to C2 components are individually selected and applied.

The prediction unit 115 executes the motion compensation prediction process on the macroblock basis with respect to all or part of the block sizes/sub-block sizes of FIG. 10, the motion vector in the predetermined search range, and one or more pieces of usable reference images, thereby outputting prediction overhead information 117 containing the motion vector and a reference image index used for the prediction and a predicted image 133. A subtracter 118 obtains a prediction difference signal 119 for every block that serves as a motion compensation prediction unit from the predicted image 133 and the input video signal 13a. an encoding mode determining unit 120 carries out the selecting process from the prediction process executed by the prediction unit 115, and outputs the selected prediction difference signal 119 and a macroblock type/sub-macroblock type 121. All items of macroblock header information such as the macroblock type, the sub-macroblock type, the reference image index, and the motion vector are determined as the header information for the input video signal 3a. Then, the macroblock header information is used for encoding and multiplexed on a bit stream 9a. In a case of evaluating the optimality of the prediction efficiency, a prediction error amount with respect to the input video signal 3a serving as the encoding process target is evaluated.

Similarly, the prediction unit 115 also executes the intra prediction. When the intra prediction is executed, intra prediction mode information is output to the signal 117.

The intra prediction mode in the respective color components of the input video signals 3 is selected and applied individually for the respective color components. Note that the reference image data for conducting the intra prediction involves using a local decoded image 123 before being subjected to the process of the deblocking filter 22 (though not illustrated, the local decoded image 123 is used as the reference image data for the intra prediction and is therefore temporarily stored in the prediction unit 115). As to the intra prediction, the prediction error amount with respect to the input video signal 3a serving as the encoding processing target is evaluated. Finally, the encoding mode determining unit 120 selects, by evaluating in terms of the prediction efficiency or the encoding efficiency, whether the macroblock type is set to the intra prediction or the inter prediction.

A transformation unit 124 transforms the prediction difference signal 119 and outputs the transformed signal as a transform coefficient to a quantization unit 125. In this case, a block size serving as a unit for conducting the transform may be selected from among 4×4 and 8×8. In the AVC, a prediction target block in the intra prediction mode is configured to be adjusted to the transformation block size. In the case of making the transformation block size selectable, the block size selected when encoded is reflected in a value of a transformation block size designation flag 126, and the flag 126 is multiplexed on the bit stream 9a. The quantization unit 125 quantizes the transform coefficient to be input on the basis of a quantization parameter 127 and the quantization weighting coefficient 12a, 12b, or 12c, and outputs the quantized result as a quantized transform coefficient 128 to a variable length encoding unit 129.

Next, the process of the quantization unit 125 will be described. The transform coefficient transformed into a signal of the frequency domain from that of the spatial domain by the transformation unit 124 is separated into the low frequency domain where the distortion is easy to be caught by eyes in terms of the visual characteristics of the man and the high frequency domain where the distortion is hard to be detected. Therefore, every frequency domain is weighted. The fine quantization is conducted in the low frequency domain, while the rough quantization is conducted in the high frequency domain, whereby the quantization process adapted to the visual characteristics of the man can be realized. Each of the quantization weighting coefficients 12a, 12b, 12c is the weighting parameter given in every frequency domain. 16 weighting parameters are used for transforming the 4×4 block size, and 64 weighting parameters are used for transforming the 8×8 block size. As described above, the quantization weighting coefficients 12a, 12b, 12c are multiplexed on the sequence parameter set. In the case of executing the "independent encoding process," however, the quantization weighting coefficients different among the three color components can be used. Accordingly, all of the three coefficients 12a, 12b, and 12c may be multiplexed, and, in the case of using the same value, only one coefficient may also be multiplexed together with information indicating this purpose. The quantization unit 125 executes the weighted quantization process on the transform coefficients of the three color components by using each of the quantization weighting coefficient 12a or 12b or 12c, thereby obtaining the quantized transform coefficient 128. The quantized transform coefficient 128 is entropy-coded by a variable length encoding unit 129 using measures such as Huffman coding and arithmetic coding.

Further, the quantized transform coefficient 128 is restored to a local decoded prediction difference signal 132 via a inverse quantization unit 130 and a inverse transform unit 131. Then, an adder 134 adds the local decoded prediction difference signal 132 to the prediction image 133 generated based on the selected macroblock type/sub-macroblock type 121 and the prediction overhead information 117, thereby generating a local decoded image 123. The local decoded image 123 is stored, after being subjected to the block distortion removing process in a deblocking filter 122, in the memory 116 in order to be employed for the subsequent motion compensation prediction process. The quantized transform coefficient 128, the macroblock type/sub-macroblock type 121, the prediction overhead information 117 and the quantization parameter 127, which are input to the variable length encoding unit 129, are arranged and shaped according to the predetermined syntax of the macroblock encoded data, and are packetized (also called NAL unitization in the AVC) on the unit of the slice data consisting of one macroblock or the aggregation of the plurality of macroblocks in the format shown in FIG. 4. Then, the data packets are output as the bit stream 9a.

(4) Case of Intra Only Encoding Instruction Signal 13 Indicating "Intra Only Encoding"

The prediction unit 115 executes only the intra prediction process described in the item (3). When executing the intra prediction, the intra prediction mode information is output to the prediction over head information 117. Note that the reference image data for conducting the intra prediction involves using the local decoded image 123 before being subjected to the process of the deblocking filter 122 (though not illustrated, the local decoded image 123 is used as the reference image data for the intra prediction and is therefore temporarily stored in the prediction unit 115). The intra prediction in the AVC is as described above and executed with respect to the input video signal 3a. Therefore, the intra prediction mode in the respective color components of the input video signals 3 is selected and applied individually for the respective color components. The encoding mode determining unit 120 selects the intra prediction mode by evaluating in terms of the prediction efficiency or the encoding efficiency.

The encoding mode determining unit 120 outputs the selected prediction difference signal 119 to the transformation unit 124. The transformation unit 124 transforms the received prediction difference signal 119 and outputs the transformed signal as a transform coefficient to the quantization unit 125. In this case, the block size serving as the unit for conducting the transform may be selected from among the plurality of candidate sizes such as 4×4 and 8×8. The AVC is configured so that the prediction target block in the intra prediction mode is adjusted to the transformation block size. In the case of making the transformation block size selectable, the block size selected when encoded is reflected in a value of the transformation block size designation flag 126, and the flag 126 is multiplexed on the bit stream 9a. The quantization unit 125 quantizes the transform coefficient to be input on the basis of the quantization parameter 127 and the quantization weighting coefficient 12a, and outputs the quantized result as a quantized transform coefficient 128 to the variable length encoding unit 129. The example of the process is given as described above.

The quantized transform coefficient 128 is entropy-coded by a variable length encoding unit 129 using measures such as Huffman coding and arithmetic coding.

The quantized transform coefficient 128 is restored to the local decoded prediction difference signal 132 via the inverse quantization unit 130 and the inverse transform unit 131. Then, the adder 134 adds the signal 132 to the prediction image 133 generated based on the prediction overhead information 117, thereby generating the local decoded image 123. If the intra only encoding instruction information 113 indicates "intra only encoding," the motion compensation prediction is not executed, and hence the deblocking filter 122 executes neither the process nor the write of the data as the reference image to the memory 116. With this configuration, the memory access and the arithmetic operation needed for the process of the deblocking filter can be reduced.

The quantized transform coefficient 128, the macroblock type/sub-macroblock type 121 (fixed to the intra mode), the prediction overhead information 117 and the quantization parameter 127, which are input to the variable length encoding unit 129, are arranged and shaped according to the predetermined syntax of the macroblock encoded data, and are packetized (also called the NAL unitization in the AVC) on the unit of the slice data consisting of one macroblock or the aggregation of the plurality of macroblocks in the format shown in FIG. 4. Then, the data packets are output as the bit stream 9a.

The second picture encoding units 7a to 7c according to the first embodiment encode all pieces of slice data in the sequence with the single color component slice (i.e., the C0 slice or the C1 slice or the C2 slice) through the common encoding/independent encoding identification signal 1. Hence, the color component identification flag 2 is invariably multiplexed on the head of the slice data, whereby the decoding device can recognize which slice corresponds to which picture data in the access unit. For example, the second picture encoding unit 7a sets "0" as the value of the color component identification flag 2, the second picture encoding unit 7b sets "1" as the value of the color component identification flag 2, and the second picture encoding unit 7c sets "2" as the value of the color component identification flag 2, and each of the flag values is attached to the head of the slice data. Accordingly, even when serially multiplexing the bit streams 9a to 9c on the bit stream 11, the decoding device can readily recognize which slice therein corresponds which encoded data of the C0 or C1 or C2 component. In other words, the second picture encoding units 7a to 7c can transmit the bit stream output any time when the data for one slice is accumulated without accumulating the respective bit stream outputs for one picture.

Note that the number of the macroblocks included in the slice is restricted not by the value of the intra only encoding instruction information 13 but by the image size information 14. The image size information 14 is input to the variable length encoding unit 129. The variable length encoding unit 129 sets, based on the image size information 14, an upper limit value of the number of the macroblocks included in the slice. The variable length encoding unit 129 previously counts the number of the encoded macroblocks, and, just when the number of the macroblocks included in the slice reaches the upper limit value, closes the packet of the slice data. Subsequent macroblocks are packetized as new slice data. It should be noted that the image size information 14 has the same value with respect to the C0, C1, C2 components in the case of the 4:4:4 format, and it may therefore be enough to multiplex only one piece of data in the sequence parameter set.

Further, the first picture encoding unit 5 and the second picture encoding units 7a to 7c are different in terms of whether to treat the macroblock header information as the information common to the three color components or as the information of the single color component, and the bit stream structure of the slice data. Accordingly, the transformation unit 24, the inverse transform unit 31, the quantization unit 25, the inverse quantization unit 30 and the deblocking filter 22 of FIG. 9 are realized in a way that repeats the arithmetic operations, for the three color components, of the transformation unit 124, the inverse transform unit 131, the quantization unit 125, the inverse quantization unit 130 and the deblocking filter 122 of FIG. 11. Hence, part of the internal configurations of the first picture encoding unit 5 and the second picture encoding units 7a to 7c can also be realized by common function blocks. Accordingly, it is feasible to actualize implementation of multiform encoding devices in a way that repeatedly operates, e.g., the same circuits a plurality of times by properly combining the components of FIGS. 9 and 11 without being limited to the completely independent encoding processing unit as in FIG. 8. Further, as described above, if the arrangement of the memory 16 in the first picture encoding unit 5 is provided plane-sequentially, the reference image storage memory can be shared between the first picture encoding unit 5 and the second picture encoding units 7a to 7c.

Figure 12:
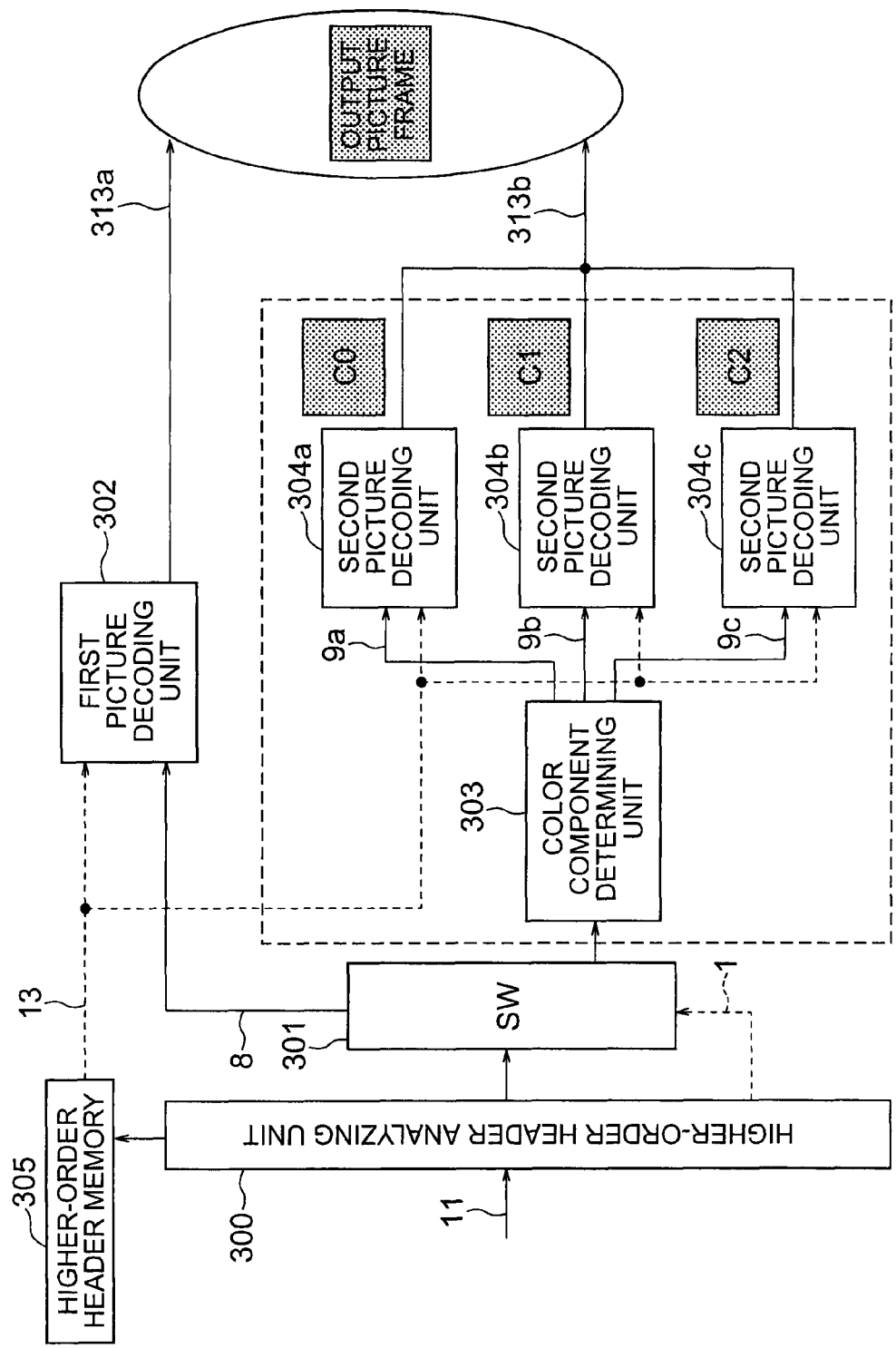
FIG. 12 is a schematic structural diagram of a decoding device according to the first embodiment of the present invention.

FIG. 12 illustrates an outline of the configuration of the decoding device according to the first embodiment. In FIG. 12, a common decoding process is executed by a first picture decoding unit 302, and an independent decoding process is executed by a color component determining unit 303 and second picture decoding units 304 (provided for the three color components).

The bit stream 11 is divided on a NAL unit basis by a higher-order header analyzing unit 300. Higher-order header information such as the sequence parameter set and the picture parameter set is decoded and stored in a higher-order header memory 305 to which the first picture decoding unit 302, the color component determining unit 303 and the second picture decoding units 304 can refer. The common encoding/independent encoding identification signal 1, the quantization weighting coefficients 12a to 12c, the intra only encoding instruction information 13 and the image size information 14, which are multiplexed on the sequence basis, are retained as part of the sequence parameter set in the higher-order header memory 305.

The decoded common encoding/independent encoding identification signal 1 is supplied to a switch (SW) 301. The switch 301, if the common encoding/independent encoding identification signal 1 indicates "being subjected to the common encoding process," supplies all of the slice NAL units in the sequence as the bit stream 8 to the first picture decoding unit 302. The switch 301, if the common encoding/independent encoding identification signal 1 indicates "being subjected to the independent encoding process," supplies all of the slice NAL units in the sequence to the color component determining unit 303. Detailed operations of the first and second picture decoding units will be described later.

The color component determining unit 303 analyzes a value of the color component identification flag 2 shown in FIG. 7 from among the received slice NAL units, then recognizes which color component picture in the present access unit the slice NAL units correspond to, and distributes the slice NAL units as bit streams 9a to 9c to the second picture decoding units 304a to 304c. The configuration of this type of decoding device has such an effect that even when receiving the bit streams into which the slices are interleaved and encoded for every color component in the access unit, it is readily determined which slice belongs to which color component picture, and the encoded bit stream can be properly decoded.

Outline of Operation of First Picture Decoding Unit

Figure 13:
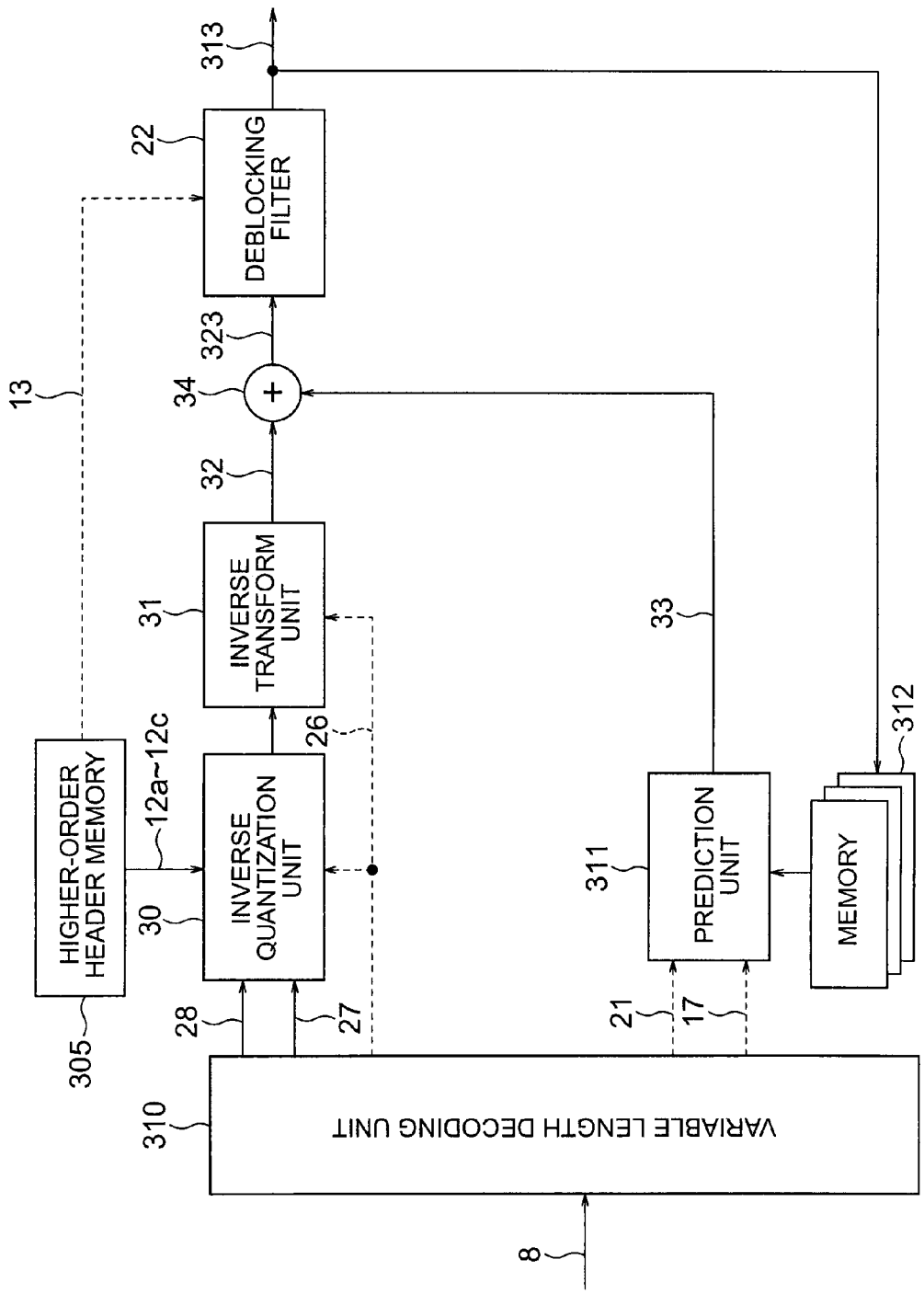
FIG. 13 is an internal structural diagram of a first picture decoding unit 302.

FIG. 13 illustrates an internal configuration of the first picture decoding unit 302. The first picture decoding unit 302 receives the bit stream 11 output from the encoding device illustrated in FIG. 8, for example, in the format of the bit stream 8 built up by the slices each consisting of the aggregation of the three color components of C0, C1, and C2. The first picture decoding unit 302 restores the output video frame by executing the decoding process on the macroblock basis. The macroblock consists of the samples (pixels) of the three color components illustrated in FIG. 3.

A variable length decoding unit 310 receives the bit stream 8, decodes the bit stream 8 according to a predetermined rule (syntax) and extracts, from the bit stream 8, the quantized transform coefficient 28 for the three color components and the macroblock header information (the macroblock type/sub-macroblock type 21, the prediction overhead information 17, the transformation block size designation flag 26 and the quantization parameter 27) used in common to the three color components.

Further, the quantized transform coefficient 28 is input together with the quantization parameter 27 to the inverse quantization unit 30 that executes the same process as the first picture encoding unit 5, thereby performing the inverse quantization process is performed. In this case, the quantization weighting coefficients 12a to 12c used for the respective color components are employed by referring to the higher-order header memory 305. Note that if the three quantization weighting coefficients 12a to 12c take the same value, the decoder is not necessarily required to internally have the coefficients as three pieces of data, and one piece of data can be employed in common. Subsequently, the output thereof is input to the inverse transform unit 31 that executes the same process as the first picture encoding unit 5, and the output is restored to the local decoded prediction difference signal 32 (if the transformation block size designation flag 26 exists in the bit stream 8, this flag 26 is referred to in the inverse quantization process and in the inverse transform process). On the other hand, the prediction unit 311, referring to the prediction overhead information 17 in the prediction unit 15 of the first picture encoding unit 5, includes only the process of generating the predicted image 33, and the macroblock type/sub-macroblock type 21 and the prediction overhead information 17 are input to the prediction unit 311, thereby obtaining the predicted image 33 for the three color components.

If the macroblock type indicates that the macroblock type is the intra prediction, the predicted image 33 for the three color components is obtained from the prediction overhead information 17 according to the intra prediction mode information. If the macroblock type indicates that the macroblock type is the inter prediction, the predicted image 33 for the three color components is obtained from the prediction overhead information 17 according to the motion vector and the reference image index. The adder 34 adds the local decoded prediction difference signal 32 to the predicted image 33, thereby acquiring a temporary decoded image 323 for the three color components. The temporary decoded image 323 is used for the motion compensation prediction of the macroblock, and is therefore, after executing the block distortion removing process on the temporary decoded image samples for the three color components by use of the deblocking filter 22 that executes the same process as the first picture encoding unit 5, output and stored as a decoded image 313 in a memory 312. The memory 312 stores a plurality of sets of reference image data each consisting of the three color components over a plurality of points of time. The prediction unit 311 generates the predicted image by selecting the reference image indicated by the reference image index extracted out of the bit stream 8 on the macroblock basis from the reference image data. As to the arrangement of the reference image data in the memory 312, these pieces of data may be stored separately and plane-sequentially for every color component, and the samples (pixels) of the respective color components may also be stored dot-sequentially. The decoded image 313 is defined as a color video frame containing the three color components.

Further, the first picture decoding unit 302 can be configured as follows. If the intra only encoding instruction information 13 stored in the higher-order header memory 305 indicates "intra only encoding," the reference image becomes unnecessary because the motion compensation prediction process is not needed. So, the process performed in the deblocking filter 22 is skipped, and writing the reference image to the memory 312 is not performed. This configuration enables the reduction in the memory access and the arithmetic operation required for the process of the deblocking filtering. Even in the case of the "intra only encoding," however, the deblocking filtering or similar post-processing filtering can be carried out as the post-processing for displaying the decoded image.

Outline of Operation of Second Picture Decoding Unit

Figure 14:
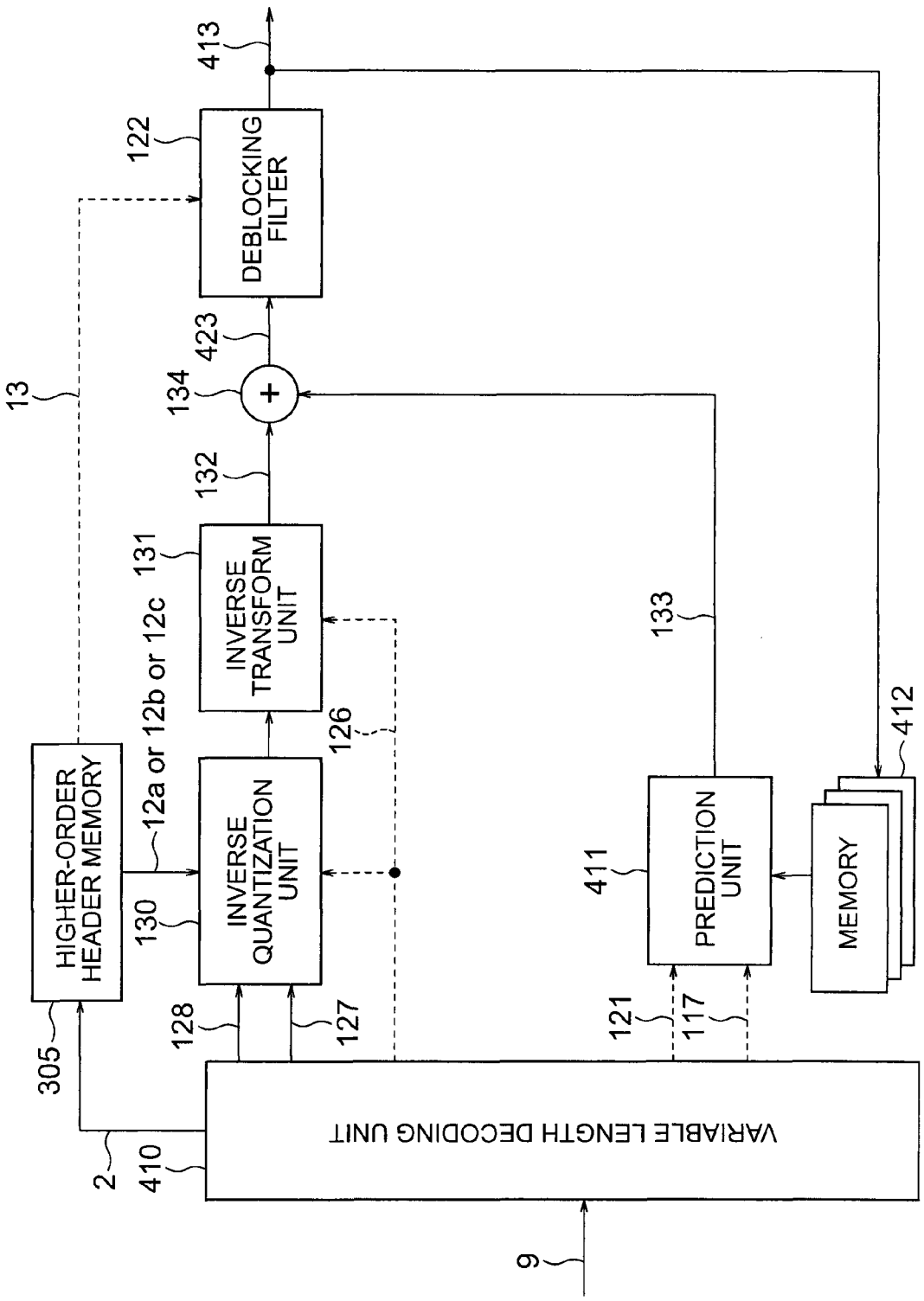
FIG. 14 is an internal structural diagram of a second picture decoding unit 304.

FIG. 14 illustrates an internal configuration of the second picture decoding unit 304. The second picture decoding unit 304 receives any one of bit streams 9a to 9c formed of C0, C1, or C2 slice NAL unit, to which the bit stream 11 output from the encoding device illustrated in FIG. 8, for example, is allocated by the color component determining unit 303. The second picture decoding unit 304 executes the decoding process on the macroblock basis. The macroblock consisting of the samples of the single color component illustrated in FIG. 4, thereby restoring the output video frame.

A variable length decoding unit 410 receives the bit stream 9, decodes the bit stream 9 according to a predetermined rule (syntax), and extracts the quantized transform coefficient 128 for the single color component and the macroblock header information applied to the single color component (the macroblock type/sub-macroblock type 121, the prediction overhead information 117, the transformation block size designation flag 126 and the quantization parameter 127). The quantized transform coefficient 128 is input together with the quantization parameter 127 to the inverse quantization unit 130 that executes the same process as the second picture encoding unit 5, thereby performing the inverse quantization process. As the quantization weighting coefficient employed in this case, based on the color component identification flag 2 decoded by the variable length decoding unit 410, one quantization weighting coefficient corresponding to the color component concerned is selected from the quantization weighting coefficients 12a to 12c in the higher-order header memory 305, and the selected quantization weighting coefficient is referred to. Subsequently, the output of the inverse quantization unit 130 is input to the inverse transform unit 131 that executes the same process as the second picture encoding unit 7, and is restored to the local decoded prediction difference signal 132 (if the transformation block size designation flag 126 exists in the bit stream 9, this flag 126 is referred to in the inverse quantization process and a reverse orthogonal transform process).

On the other hand, a prediction unit 411 includes only the process of generating the predicted image 133, referring to the prediction overhead information 117 in the prediction unit 115 of the second picture encoding unit 7, and receives the macroblock type/sub-macroblock type 121 and the prediction overhead information 117, thereby obtaining the predicted image 133 for the single color component. If the macroblock type indicates the intra prediction, the predicted image 133 for the single color component is obtained from the prediction overhead information 117 according to the intra prediction mode information. If the macroblock type indicates that macroblock type is the inter prediction, the predicted image 133 for the single color component is obtained from the prediction overhead information 117 according to the motion vector and the reference image index. The adder 134 adds the local decoded prediction difference signal 132 to the predicted image 133, thereby acquiring a temporary decoded image 423 for the single color component. The temporary decoded image 423 is used for the subsequent motion compensation prediction of the macroblock. Therefore, after executing the block distortion removing process on the temporary decoded image samples for the single color component by use of the deblocking filter 122 that executes the same process as the second picture encoding unit 7, the temporary decoded image 423 is output as a decoded image 413 to be stored in a memory 412. The decoded image 413 includes only the samples of the single color component, and is, as illustrated in FIG. 5, formed as a color video frame by binding the respective outputs of the second picture decoding units 304 for other color components.

Further, the second picture decoding unit 304 can be configured as follows. If the intra only encoding instruction information 113 stored in the higher-order header memory 305 indicates that intra only encoding instruction information 113 is "intra only encoding," the reference image becomes unnecessary because the motion compensation prediction process is not needed. So the process performed in the deblocking filter 122 is skipped, and writing the reference image to the memory 412 is not performed. This configuration enables the reduction in the memory access and the arithmetic operation required for the process of the deblocking filtering. Even in the case of the "intra only encoding," however, the deblocking filtering or similar post-processing filtering can be carried out as the post-processing for displaying the decoded image.

As apparent from the above description, the first picture decoding unit 302 and the second picture decoding unit 304 are different in terms of whether to treat the macroblock header information as the information common to the three color components or as the information of the single color component, and the bit stream structure of the slice data. Hence, the basic decoding process blocks such as the prediction unit, the inverse transform unit and the inverse quantization unit of FIGS. 13 and 14 can be realized by the function blocks common to the first picture decoding unit 302 and the second picture decoding unit 304. Accordingly, it is possible to actualize implementation of multiform decoding devices by properly combining the basic components of FIGS. 13 and 14 without being limited to the completely independent encoding processing unit as illustrated in FIG. 12. Further, if the arrangement of the memory 312 in the first picture decoding unit 302 is provided plane-sequentially, the structures of the memory 312 and the memory 412 can be made common to the first picture decoding unit 302 and the second picture decoding unit 304.

The first picture decoding unit and the second picture decoding unit in the first embodiment have been described such that the decoding units receive the bit stream 11 output by the encoding device. However, the bit stream input to the first picture decoding unit and the second picture decoding unit are not limited to the bit stream output by the encoding device, and bit streams read from storage mediums such as a hard disc and a DVD, and bit streams read from a server and transmitted via a network may be input.

Figure 15:
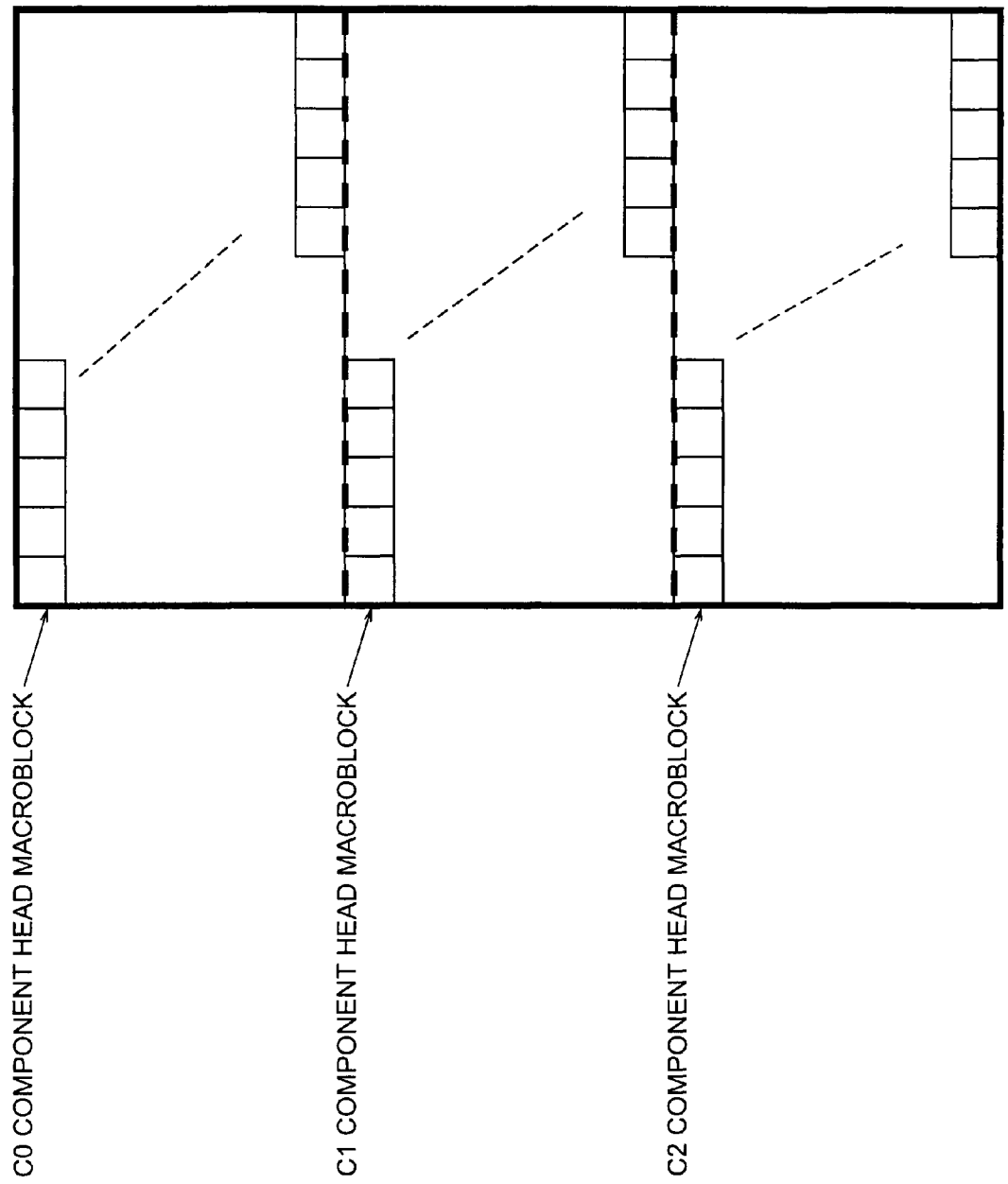
FIG. 15 is an explanatory diagram showing an example of how picture data for the three color components is allocated.

Note that the encoding device and the decoding device according to the above embodiment, in the case of the independent encoding process, as shown in FIG. 15, can achieve the same effect also by arranging the picture data for the three color components in sequence and treating these pieces of data as one set of picture data. At this time, the arrangement is made so that, corresponding to a single color pixel array, three pieces of data are connected in the vertical direction, with respect to color video signals with H pixels in the horizontal direction and V-lines in the vertical direction, and the image size information 14 is set to have H pixels in the horizontal direction and (V×3) lines in the vertical direction. It should be noted that in the encoding device and the decoding device according to the first embodiment, in order that the signals of the respective components may be treated as the independent pictures, the dependency among the color components are eliminated in the encoding/decoding processes at the boundaries the bold dotted line of FIG. 15 between the respective color components. The following conditions are given by way of an example of eliminating the dependency.

When encoded, in the macroblocks positioned at the boundaries between the respective color components, the motion vector search does not employ the neighboring pixels of other color components, and an off-plane search is conducted so as to extend edge point pixels of the self-color component in the same way as the process for the plane boundary. When decoded, in the macroblocks positioned at the boundaries between the color components, if the motion vector deviates from the image area of the self-color component (if the off-plane search is conducted), instead of employing the pixel signals of other colors, the predicted image is generated by extending the edge point pixels of the self-color component as deemed to be a plane boundary.

The deblocking filtering process is not performed between the blocks positioned at the boundaries between the respective color components.

In the case of using a learning-oriented arithmetic coding for the variable length encoding/variable length decoding processes in the encoding/decoding processes of the macroblocks of the color components, a probability model is provided individually for every color component, and a learning process is independently executed for every color component.

The independence of the signal of each color component is acquired by applying these conditions, and, the first, second and third picture encoding/decoding units can independently execute the processes, respectively.

Further, restrictions are imposed so that a slice is inhibited from being defined across the boundaries of the respective color components, one slice is prevented from containing the encoded data of the plurality of different color components, and the head macroblock data of each color component invariably becomes the head macroblock of the slice data.

Still further, a configuration for specifying which slice data belongs to which color component may involve explicitly specifying the color component to which the slice belongs by defining the color component identification flag "color_channel_idc" and attaching the flag to the head field of the slice data. Another configuration may involve using not "color_channel_idc" but the head macroblock address of each slice data and the image size information 14, and recognizing which slice data belongs to which color component. For example, when a horizontal pixel count W=1920 and a vertical pixel count V=1080, "0", "8160" and "16320" are given as the head macroblock addresses of the C0, C1, and C2 components, so, the macroblocks having the macroblock addresses "0-8159" are allocated to the C0 component, the macroblocks having the addresses "8160-16319" are allocated to the C1 component, and the macroblocks having the addresses "16320-24479" are allocated to the C2 component.

With the configurations, the picture/access unit structure for the common encoding process/independent encoding process can be made common, thereby enhancing the efficiency of the random access and the editing operation

What is claimed is:

1. An image decoding method for decoding color image signals based on an input of bit streams generated by subjecting a color image in a 4:4:4 format to compression encoding, comprising a decoding step in which:
   identification information and quantization matrix information which are included in the bit streams are decoded, the identification information indicating whether or not signals of respective color components are encoded by an independent encoding process, wherein said independent encoding process corresponds to a process of encoding the respective color component signals of one frame by an individual independent macroblock type information, the quantization matrix information being used for an inverse quantization process of the respective color components; and
   in a case where the identification information indicates that the signals of respective color components are encoded by the independent encoding process, color component identification information for identifying which of the color components the encoded data included in a slice corresponds to is decoded from a slice header of the slice, and
   a quantization matrix to be used in a decoding process of the slice is specified based on the color components identification information.

2. An image decoding device for decoding color image signals based on an input of bit streams generated by subjecting a color image in a 4:4:4 format to compression encoding, comprising:
   a decoding unit for decoding identification information and quantization matrix information which are included in the bit streams, the identification information indicating whether or not signals of respective color components are encoded by an independent encoding process, wherein said independent encoding process corresponds to a process of encoding the respective color component signals of one frame by an individual independent macroblock type information, the quantization matrix information being used for an inverse quantization process of the respective color components; and
   in a case where the identification information indicates that the signals of respective color components are encoded by the independent encoding process, the decoding unit decodes color component identification information included in a slice header, the color component identification information being for identifying which of the color components the encoded data included in the slice corresponds to, and specifies, based on the color components identification information, a quantization matrix to be used in a decoding process of the slice.

3. An image decoding device for obtaining image signals by decoding compressed data of digital moving image signals in a 4:4:4 format, comprising:
   a high-order header analyzing unit for decoding an identification signal included in the compressed data, the identification signal indicating whether the three color component signals have been encoded in a common encoding mode or in independent encoding modes, wherein said common encoding mode corresponds to a process of encoding the three color component signals of one frame by a common macroblock type information and wherein said independent encoding mode corresponds to a process of encoding the three color component signals of one frame by an individual independent macroblock type information; and
   a picture decoding unit,
   wherein, according to the identification signal, in a case where the three color component signals are decoded in the independent encoding modes, the picture decoding unit performs a decoding process together with an inverse quantization process by using independent quantization matrices, and
   in case of performing the inverse quantization process by using the independent quantization matrices, the picture decoding unit identifies, by using a color component identification flag included in the compressed data, which of the three color component signals the color component signal corresponds to, and performs the inverse quantization process by using a quantization matrix determined based on the color component identification flag.

4. An image decoding device for obtaining image signals by decoding compressed data of digital moving image signals in a 4:4:4 format, comprising:

a high-order header analyzing unit for decoding an identification signal included in the compressed data, the identification signal indicating whether the three color component signals have been encoded in a common encoding mode or in independent encoding modes, wherein said common encoding mode corresponds to a process of encoding the three color component signals of one frame by a common macroblock type information and wherein said independent encoding mode corresponds to a process of encoding the three color component signals of one frame by an individual independent macroblock type information; and a picture decoding unit, wherein, according to the identification signal, in a case where the three color component signals are decoded in the independent encoding modes, the picture decoding unit performs a decoding process together with an inverse quantization process by using the independent quantization matrices, and in a case of performing the inverse quantization process by using the independent quantization matrices, the picture decoding unit identifies, by using a color component identification flag included in the compressed data, which of the three color component signals the color component signal corresponds to, and makes motion compensation prediction by using a reference image determined based on the color component identification flag.

* * * * *